United States Patent
Sirkar

(10) Patent No.: US 9,085,476 B2
(45) Date of Patent: Jul. 21, 2015

(54) PERVAPORATION MEMBRANES HIGHLY SELECTIVE FOR VOLATILE SOLVENTS PRESENT IN FERMENTATION BROTHS

(75) Inventor: Kamalesh K. Sirkar, Bridgewater, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 713 days.

(21) Appl. No.: 12/202,940

(22) Filed: Sep. 2, 2008

(65) Prior Publication Data

US 2009/0114594 A1    May 7, 2009

Related U.S. Application Data

(60) Provisional application No. 60/967,045, filed on Aug. 31, 2007.

(51) Int. Cl.
*B01D 69/08* (2006.01)
*B01D 61/36* (2006.01)
*B01D 61/38* (2006.01)
(Continued)

(52) U.S. Cl.
CPC ........... *C02F 1/44* (2013.01); *B01D 61/362* (2013.01); *B01D 61/38* (2013.01); *B01D 69/08* (2013.01); *B01D 69/105* (2013.01); *C02F 1/26* (2013.01); *B01D 2325/04* (2013.01); *B01D 2325/38* (2013.01); *B01D 2325/40* (2013.01);
(Continued)

(58) Field of Classification Search
CPC .... B01D 61/36; B01D 61/362; B01D 61/366; B01D 61/368; B01D 63/38; B01D 61/40; B01D 67/009; B01D 69/10; B01D 69/105; B01D 69/122; B01D 71/32; B01D 71/56; B01D 71/60; B01D 71/62; B01D 71/64; B01D 71/70; B01D 2323/28; B01D 2323/283; B01D 2323/40; B01D 2323/42; B01D 2323/46; B01D 2325/04; B01D 2325/38; B01D 61/38; B01D 69/08; B01D 2325/40; C02F 1/26; C02F 1/44; C02F 1/448; C02F 3/286; C02F 2201/322
USPC ................................. 210/511; 96/5–8, 10, 14
See application file for complete search history.

(56) References Cited

U.S. PATENT DOCUMENTS 4,806,246 A * 2/1989 Nomura ........................ 210/651
4,973,434 A 11/1990 Sirkar et al.
(Continued)

OTHER PUBLICATIONS

Li et al., Novel membrane and device for vacuum membrane distillation-based desalination process, Mar. 7, 2005, Elsevior, Journal of Membrane Science 257, pp. 60-75.*
(Continued)

*Primary Examiner* — David C Mellon
(74) *Attorney, Agent, or Firm* — McCarter & English, LLP

(57) ABSTRACT

Liquid membrane systems are provided for use in pervaporation techniques that achieves high selectivity, ensure stability and prevent contamination of the fermentation broth. Tri-n-octylamine (TOA), tri-laurlyamine or tri-decylamine as a liquid membrane is immobilized in the pores of a hydrophobic hollow fiber substrate having a nanoporous hydrophobic coating on the broth side. The liquid membrane in the coated hollow fibers demonstrate high selectivity and reasonable mass fluxes of solvents in pervaporation. The mass fluxes were substantially increased with the same selectivity of solvents when an ultrathin liquid membrane was used. The addition of butanol into the feed solution increases membrane selectivity.

12 Claims, 24 Drawing Sheets

(51) Int. Cl.
| | |
|---|---|
| *B01D 69/10* | (2006.01) |
| *C02F 1/44* | (2006.01) |
| *C02F 1/26* | (2006.01) |
| *C02F 3/28* | (2006.01) |
| *C02F 101/32* | (2006.01) |

(52) U.S. Cl.
CPC ............... *C02F 1/448* (2013.01); *C02F 3/286* (2013.01); *C02F 2101/322* (2013.01)

(56) References Cited

U.S. PATENT DOCUMENTS

| | | | |
|---|---|---|---|
| 5,637,224 A | 6/1997 | Sirkar et al. | |
| 5,933,515 A | 8/1999 | Pu et al. | |
| 6,086,769 A * | 7/2000 | Kilambi et al. | 210/638 |
| 6,096,217 A | 8/2000 | Kilambi et al. | |
| 6,171,563 B1 | 1/2001 | Ho | |
| 6,433,163 B1 | 8/2002 | Ho | |

OTHER PUBLICATIONS

Sirkar, Kamalesh, Membranes, Phase Interfaces, and Separations: Novel Techniques and Membranes—An Overview, Jul. 15, 2008, Ind. Eng. Chem. Res, 2008, 47, pp. 5250-5266.*
Abrams, et al., Appendix H, UNIFAC Method, AIChE J., vol. 21, pp. 116-128, 1975.
Wilke, et al., Correlation of Diffusion Coefficients in Dilute Solutions, AIChE J., 1 (1955) pp. 264-270.
King, Separation Processes, (Table of Contents), 2$^{th}$ Ed., McGraw-Hill, New York, 1980, pp. ix-xviii.
Matsumura et al., Application of Solvent Extraction to Ethanol Rementation, Appl. Mecrobiol. Biotechnol., 20 (1984) pp. 371-377.
Groot et al., Pervaporation for Simultaneous Product Recovery in the Butanol/Isopropanol Batch Fermentation, Biotechnol Lett., 6(11) (1984) pp. 709-714.
Groot et al., Increase of Substrate Conversion by Pervaporation in the Continuous Butanol Fermentation, Biotechnology Lett., 6(12) (1984) pp. 789-792.
Ritcey et al., Solvent Extraction: Principles and Applications to Process Metallurgy, Part 1, Elsevier, New York, 1984, pp. 326.
Crabbe, et al., Effect of Microorganisms on Rate of Liquid Extraction of Ethanol From Fermentation Broths, Biotechnol. Bioeng. 1986, 28, pp. 939-943.
Reid, et al., The Properties of Gases and Liquids, 4$^{th}$ Ed., McGraw-Hill, New York, 1986; pp. 669-690.
Larrayoz et al., Study of Butanol Extraction Through Pervaporation in Acetobutylic Fermentation, Biotechnol Bioeng., 30 (1987) pp. 692-696.
Matsumura et al., Separation of Dilute Aqueous Butanol and Acetone Solutions by Pervaporation Through Liquid Membranes, Biotechnol. Bioeng. 30 (1987) pp. 1991-1993.
Chen et al., Extraction of Lower Carboxylic Acids From Aqueous Solution by tri-n-Octylamine, J. Chem. Eng. of Japan, 22 (1989), pp. 6-11.
Shukla, et al., Acetone-Butanol-Ethanol (ABE) Production in a Novel Hollow Fiber Fermentor-Extractor, Biotechnol. Bioeng. 1989, 34, pp. 1158-1166.
Kobayashi, et al., Surface Tension of Poly[(3,3,4,4,5,5,6,6-nonafluorohexyl)-methylsiloxane], Macromolecules, 1990, 23, pp. 4929-4933.
Tamada et al., Extraction of Carboxylic Acid with Amine Extractants (1-3), Ind. Eng. Chem. Res., 29 (1990) pp. 1319-1338.
Mori et al., Ethanol Production From Starch in a Pervaporation Membrane Bioreactor Using *Clostridium thermohydrosulfuricum*, Biotech. Bioeng., 36 (1990) pp. 849-853.
Hickey et al., The Effect if Process Parameters in the Pervaporation of Alcohols Through Organophilic Membranes. Seperation Sci. Tech., 27(7) (1992) 843-861.
Fahim et al., Extraction Equilibria of Acetic and Propionic Acids from Dilute Aqueous Solutions by Several Solvents, Separation Sci. and Tech., 27 (1992) pp. 1809-1821.
Starr, Water-Enhanced Solubility of Carboxylic Acids in Organic Solbents and its Application to Extraction Process, Ind. Eng. Chem. Res., 31 (1992) pp. 2572-2579.
Oswal, et al., Study of Viscosity of Mono-, Di-, and Trialkylamines, Int. J. Thermophys., 13 (1992) pp. 617-628.
Vrana et al., Pervaporation of Model Acetone-Butanol-Ethanol Fermentation Product Solutions Using Polytetrafluoroethylene Membranes, Seperation Sci. Tech., 28 (13&14) (1993) pp. 2167-2178.
Ziegenfuβ, Distribution of Acetic Acid Between Water and Organic Colution of tri-n-octylamine, Fluid Phase Equilibria, 102 (1994) pp. 211-255.
Vazquez, et al., Surface Tension of Alcohol + Water From 20-50° C., J. Chem. Eng. Data. 1995, 40, pp. 611-614.
Eyal, pH Dependence of Carboxylic and Mineral Acid Extraction by Amine-Based Extracts: Effects of $pK_a$ Amine Basicity and Diluent Properties, Ind. Eng. Chem. Res., 34 (1995) 1789-1798.
Solichien, et al., Membrane-Based Extractive Fermentation to Produce Propionic and Acetic Acids: Toxicity and Mass Tansfer Considerations, Enzyme Microb. Technol. 1995, 17, pp. 23-31.
Sano et al., Estimation of Dealumination Rate of ZSM-5 Zeolite by Adsorption of Water Vapor, Zeolites, 16 (1996) pp. 258-264.
Matsumoto, Extraction kinetics of Organic Acids with Tri-n-octylphosphine Oxide, J. Chem. Tech. Biotechnol., 67 (1996) pp. 260-264.
Kirsch, et al., Distribution of Citric, Acetic and Oxalic Acids Between Water and Organic Solutioins of Tri-n-octylamine, Fluid Phase Equilibria, 129 (1997), pp. 235-266.
Sano et al., Separation of Acetic Acid-Water Mixtures by Pervaporation Through Silicalite Membrane, J. Membrane Sci., 123 (1997) pp. 225-233.
Kolb, et al., Static Headspace-Gas chromatography: Theory and practice, Wiley-VCH, New York, 1997, pp. v-x.
Chen, et al., Separation Properties of Alcohol-Water Mixture Through Silicalite-1-Filled Silicone Rubber Membranes by Pervaporation. J Appl. Polym. Sci. 1998, 67, pp. 629-636.
Ball, et al., RB., Pervaporation Studies with Polyaniline Membranes and Blends, J. Membr. Sci. 2000, 174, pp. 161-176.
Sampranpiboon, et al., Pervaporation Separation of Ethyl Butyrate and Isopropanol with Polyether Block Amide (PEBA) Membranes, J Membr. Sci. 2000, 173, pp. 53-59.
Pesti, Reversible Michael Reaction-Enzymatic Hydrolysis: A New Variant of Dynamic Resolution, J. Am. Chem. Soc. 123 (2001) pp. 11075-11076.
Qureshi et al., Acetone Butanol Ethanol (ABE) Recovery by Pervaporation Using Silicalite-Silicone Composite Membrane From Fed-Batch Reactor of *Clostridium acetobutylicum*, J. Membrane Sci., 187 (2001) pp. 93-102.
Matsuda et al., Improvement of Ethanol Selectivity of Silicate Membrane in Pervaporation by Silicone Rubber Coating, J. Membrane Sci., 210 (2002) pp. 433-437.
Ikegami et al., Concentration of Fermented Ethanol by Pervaporation Using Silicalite Membranes Coated With Silicone Rubber, Desalination, 149 (2002) pp. 49-54.
Wodzki et al., Propionic and Acetic Acid Pertraction Through a Multimembrane Hybrid System Containing TOPO or TBP, Separation/Purification Technology, 26 (2002) pp. 207-220.
Sirkar, Supported Liquid Membrane-Based Pervaporation for VOC Removal from Water, published in the Industrial and Engineering Chemistry Research Journal in 2002, pp. 3413-3428.
Gonzalez-Velasco, et al., Pervaporation of Ethanol-Water Mixtures Through Poly(l-trimethylsilyl-l-propyne)(PTMSP) Membranes, Desalination, 149 (2002) 61-65.
Chang, et al., Preparation of Composite Membranes of Functionalized Silicone Polymers and PVDF for Pervaporation of Ethanol-Water Mixture. Desalination, 148 (2002) 39-42.
Qin et al., Pervaporation Membrane that are Highly Selective for Acetic Acid Over Water, Ind. Eng. Chem. Res., 42 (2003) pp. 582-595.

(56) References Cited

OTHER PUBLICATIONS

Fadeev, et al., Effect of Yeast Fermentation By-Products on Poly[1-(trimethylsilyl-l-propyne] Pervaporative Performance, J. Membr. Sci. 2003, 214, pp. 229-238.

Ghofar et al., The Pervaporation Mechanism of Dilute Ethanol Solution by Hydrophobic Porous Membranes., Biochem. Eng. J., 18 (2004) pp. 235-238.

Guo et al., Pervaporation Study on the Dehydration of Aqueous Butanol Solutions: A Comparison of Flux vs. Permeance, Separation Factor vs. Selectivity, J. Membrane Sci. 245 (2004) pp. 199-210.

Smitha, et al., Separation of Organic-Organic Mixtures by Pervaporation—A Review, J. Membrane Sci., 214 (2004) pp. 1-21.

Krea, et al., Synthesis of Polysiloxane-imide Membranes—Application to the Extraction of Organics from Water Mixtures, Desalination, 163 (2004) pp. 203-206.

Vane, A Review of Pervaporation for Product Recovery From Biomass Fermentation Process, J. of Chemical Tech. and Biotech., 80 (2005) pp. 603-629.

Li et al., Novel Membrane and Device for Vacuum Membrane Distillation-Based Desalination Process, Journal of Membrane Science, 257 (2005) pp. 60-75.

She et al., Effects of Concentration, Temperature, and Coupling on Pervaporation of Dilute Flavor Organics, J. Membrane Sci., 271 (2006) pp. 16-28.

Alper, Engineering Yeast Transcription Machinery for Improved Ethanol Tolerance and Production, Science, 314, No. 5805, (2006), pp. 1565-1568.

She, et al., Recovery of Key Components From Real Flavor Concentrates by Pervaporation, J Membr. Sci. 2006, 279, pp. 86-93.

Korikov, et al., Interfacially Polymerized Hydrophilic Microporous Thin Film Composite Membranes on Porous Polypropylene Hollow Fibers and Flat Films, J. Membr. Sci. 2006, 279, pp. 588-600.

Thongsukmak, et al., Pervaporation Membranes Highly Selective for Solvents Present in Fermentation Broths, J. Membrane Sci., 302 (2007) pp. 45-58.

\* cited by examiner

PERVAPORATION MEMBRANES HIGHLY SELECTIVE FOR VOLATILE SOLVENTS PRESENT IN FERMENTATION BROTHS

CROSS-REFERENCE TO RELATED APPLICATION

The present application is related to and claims priority benefit to a commonly assigned provisional patent application entitled "PERVAPORATION MEMBRANE HIGHLY SELECTIVE FOR SOLVENTS PRESENT IN FERMENTATION BROTHS," which was filed on Aug. 31, 2007 and assigned Ser. No. 60/967,045. The entire contents of the foregoing provisional patent application are incorporated herein by reference.

TECHNICAL FIELD

The present disclosure relates to the separation of volatile liquid solvents via a pervaporation process. More particularly, the present disclosure relates to highly selective pervaporation membranes used in the removal of solvents in fermentation broths. Specifically, the present disclosure relates to a method and apparatus in which a hollow fiber based supported liquid pervaporation membrane, which displays high selectivity and extremely low instability, is used in the removal of solvents in fermentation broths.

BACKGROUND

Pervaporation is an energy efficient alternative to distillation for removing volatile organic compounds (VOCs) from water, especially solvents from their dilute solutions in a fermentation broth. Polymeric, ceramic, and liquid membranes have been used in the pervaporation process for removing such solvents. Liquid membranes generally provide high solvent selectivity and are therefore an attractive choice for membrane material. However, liquid membranes have a tendency to degrade rapidly. The instability of liquid membranes presents a major problem and drawback with respect to their use. In particular, three significant problems arise because of the instability and degradation of liquid membranes. First, membrane selectivity significantly decreases, resulting in a permeation of water through the membrane. Second, the process stream, e.g., fermentation broth, becomes contaminated by the liquid membrane. Third, the liquid membrane can disappear over a period of time.

In typical pervaporation processes, feed liquid containing volatile species flows on one side of a membrane, while the permeate side is maintained under vacuum. The driving force for the process is the difference between the hypothetical species partial pressure in equilibrium with the feed liquid and the permeate side partial pressure in the vapor phase.

Fermentation processes can generate a variety of byproducts, such as acetone, ethanol, butanol, acetic acid, propionic acid, etc. These compounds have a variety of potential uses, e.g., such compounds can be used as solvents, fuels and/or chemical intermediates. However, the solvent concentrations in a fermentation broth are often quite low; around 1-2% [see, e.g., N. Qureshi et al., *Acetone Butanol Ethanol (ABE) Recovery by Pervaporation Using Silicalite-Silicone Composite Membrane From Fed-Batch Reactor of Clostridium Acetobutylicum*, J. Membrane Sci., 187 (2001) 93-102]. For these low solvent levels in a fermentation broth, distillation is not an economical process for solvent recovery from the solution.

Pervaporation is a promising technique for the separation of solvents from solutions having a low concentration of solvents.

A variety of membranes have been used in pervaporation processes for dilute solutions. Examples include:

Polymeric membranes made of polydimethylsiloxane (PDMS) (and composites) [see, e.g., N. Qureshi et al., *Acetone Butanol Ethanol (ABE) Recovery by Pervaporation Using Silicalite-Silicone Composite Membrane From Fed-Batch Reactor of Clostridium Acetobutylicum*, J. Membrane Sci., 187 (2001) 93-1021; L. M. Vane, *A Review of Pervaporation for Product Recovery From Biomass Fermentation Process*, J. of Chemical Tech. and Biotech., 80 (2005) 603-629; Y. Mori et al., *Ethanol Production From Starch in a Pervaporation Membrane Bioreactor Using Clostridium Thermohydrosulfuricum*, Biotech. Bioeng., 36 (1990) 849-853; M. She et al., *Effects of Concentration, Temperature, and Coupling on Pervaporation of Dilute Flavor Organics*, J. Membrane Sci., 271 (2006) 16-28; and P. J. Hickey et al., *The Effect if Process Parameters in the Pervaporation of Alcohols Through Organophilic Membranes*. Seperation Sci. Tech., 27(7) (1992) 843-861]

Polymeric membranes made of polytetrafluoroethylene (PTFE) [see, e.g, L. M. Vane, *A Review of Pervaporation for Product Recovery From Biomass Fermentation Process*, J. of Chemical Tech. and Biotech., 80 (2005) 603-629; Y. Mori and T. Inaba, *Ethanol Production From Starch in a Pervaporation Membrane Bioreactor Using Clostridium Thermohydrosulfuricum*, Biotech. Bioeng., 36 (1990) 849-853; A. Ghofar et al., *The Pervaporation Mechanism of Dilute Ethanol Solution by Hydrophobic Porous Membranes.*, Biochem. Eng. J., 18 (2004) 235-238; and D. L. Vrana et al., *Pervaporation of Model Acetone-Butanol-Ethanol Fermentation Product Solutions Using Polytetrafluoroethylene Membranes*, Seperation Sci. Tech., 28 (13&14) (1993) 2167-2178]

Polymeric membranes made of polyvinyl alcohol (PVA) (and its composites) [see, e.g., W. F. Guo et al., *Pervaporation Study on the Dehydration of Aqueous Butanol Solutions: A Comparison of Flux vs. Permeance, Separation Factor vs. Selectivity*, J. Membrane Sci. 245 (2004) 1999-210]

Ceramic membranes such as silicalite (zeolite) membranes, alumina or composite membranes [see, e.g., N. Qureshi et al., *Acetone Butanol Ethanol (ABE) Recovery by Pervaporation Using Silicalite-Silicone Composite Membrane From Fed-Batch Reactor of Clostridium Acetobutylicum*, J. Membrane Sci., 187 (2001) 93-102; H. Matsuda et al., *Improvement of Ethanol Selectivity of Silicate Membrane in Pervaporation by Silicone Rubber Coating*, J. Membrane Sci., 210 (2002) 433-437; T. Ikegami et al., *Concentration of Fermented Ethanol by Pervaporation Using Silicalite Membranes Coated With Silicone Rubber*, Desalination, 149 (2002) 49-54; T. Sano et al., *Estimation of Dealumination Rate of ZSM-5 Zeolite by Adsorption of Water Vapor*, Zeolites, 16 (1996) 258-264; and T. Sano et al., *Separation of Acetic Acid-Water Mixtures by Pervaporation Through Silicalite Membrane*, J. Membrane Sci., 123 (1997) 225-233]

Liquid membranes of oleyl alcohol, decyl alcohol, tricresylphophate, tri-n-butylphosphate, and the like [see, e.g., Y. Qin et al., *Pervaporation Membrane that are Highly Selective for Acetic Acid Over Water*, Ind. Eng. Chem. Res., 42 (2003) 582-595; M. A. Fahim et al., *Extraction Equilibria of Acetic and Propionic Acids* from *Dilute Aqueous Solutions by Several Solvents*, Separation Sci. and Tech., 27 (1992) 1809-1821; R. Wodzki et al., *Propionic and Acetic Acid Pertraction Through a Multimembrane Hybrid System Containing TOPO or TBP*, Separation/Purification Technology, 26 (2002) 207-220; and M. Matsumura et al., *Separation of dilute aqueous butanol and acetone solutions by pervaporation through liquid membranes*, Biotechnol. Bioeng. 30 (1987) 1991-1992].

In general, the concentration of solvents in the permeate stream from polymeric membranes and ceramic membranes are lower compared with those from liquid membranes. The liquid membranes generally have a higher selectivity, making liquid membranes an area of significant interest for the recovery of dilute amounts of solvents from aqueous solutions.

With reference to the patent literature, U.S. Pat. No. 5,637,224 (the "'224 patent") relates to the removal of volatile organic compounds from aqueous solutions using a hollow fiber contained liquid membrane. The '224 patent is directed to a system for transferring a vaporizable solute from a feed solution to an extractant liquid and then removing the solute from the extractant solution. Hollow fiber supported liquid membranes (SLM) and plasma polymerized non-porous silicone coatings are disclosed in the '224 patent. U.S. Pat. No. 5,933,515 (the "'515 patent") discloses hollow fiber modules that rely on vacuum driven pervaporation with single fiber units for removal of solvents. In addition, the problem of liquid membrane stability is widely discussed in the art. Typically, the patent literature has been directed to methods for replenishing the liquid membrane as it degrades (see, e.g., U.S. Pat. Nos. 6,433,163, 4,973,434 and 6,096,217).

The literature also includes two (2) publications co-authored by the present inventor: (i) "Supported Liquid Membrane-Based Pervaporation for VOC Removal from Water," published in the Industrial and Engineering Chemistry Research Journal in 2002, and (ii) "Novel Membrane and Device for Vacuum Membrane Distillation-Based Desalination Process," published in the Journal of Membrane Science. The two publications are briefly summarized as follows:

Supported Liquid Membrane-Based Pervaporation for VOC Removal from Water: The publication discloses experimentation involving use of a liquid membrane supported by a plasma-polymerized non-porous silicone coated microporous hydrophobic polypropylene hollow fiber membrane for removal of VOCs from waste water streams. The disclosed liquid membranes are formed by mixing hexane with a pure dodecane supported liquid membrane. The mixture was immobilized in the support substrate and the hexane was removed by applying a vacuum to the shell side of the fibers, leaving a thin dodecane layer in the pores. In the reported experiments, the feed solution is passed through the hollow fibers, with the vapor drawn through the porous/non-porous layers to the exterior of the fibers.

Novel Membrane and Device for Vacuum Membrane Distillation-Based Desalination Process: The publication describes a plasma-polymerized ultrathin porous coating of fluorosilicone on a porous hydrophobic polypropylene hollow fiber membrane. The coating was used to prevent wetting and fouling of the pores in the hollow fiber membrane during a desalination process. In the disclosed desalination process, water vapor passes through a hydrophobic porous membrane, so as to yield a concentrated brine solution on one side and purified water on the other. In the context of desalination, a highly selective liquid membrane barrier is not needed as is the case for the removal and recovery of volatile organic acids from aqueous solutions.

In the field of liquid membranes, various membrane materials have been disclosed. For example, U.S. Pat. No. 6,171,563 discloses a two step process for the removal and recovery of chromium from waste water using a trioctylamine (TOA) supported liquid membrane embedded in a microporous support in a liquid to liquid extraction technique.

Despite efforts to date, a need remains for apparatus, systems and methods that provide, inter alia, enhanced selectivity and stability in a pervaporation process. Moreover, a need remains for apparatus, systems and methods for use in removing solvents, e.g., VOCs, from a fermentation broth. These and other needs are satisfied by the disclosed apparatus, systems and methods.

SUMMARY

According to the present disclosure, advantageous coated hollow fiber supported liquid membranes are provided that offer enhanced selectivity and stability in pervaporation process(es). In addition, the disclosed apparatus, systems and methods may be effectively employed in removing solvents, e.g., VOCs, from a fermentation broth. Thus, in exemplary embodiments of the present disclosure, advantageous coated porous hydrophobic hollow fiber membranes containing liquid membranes in the pores of such hollow fiber substrate are disclosed, as are methods of using such membranes in pervaporation processes. In further exemplary embodiments of the present disclosure, a substantial reduction in the thickness of the liquid membrane is advantageously permitted, while delivering highly desirable membrane performance.

Additional embodiments of the present disclosure utilize a variety of porous hydrophobic hollow fiber substrates, including but not limited to polypropylene, polyethylene, poly-4-methylpentene, polysulfone, polyvinylidenefluoride (PVDF).

In an exemplary embodiment of the present disclosure, a pervaporation method is disclosed wherein an ultrathin liquid membrane, e.g., between about 2 microns and 50 microns, is provided in coated hydrophobic hollow fibers to remove and recover volatile organic solvents (VOCs) with very high selectivity directly from an unfiltered fermentation broth. In the disclosed embodiment, the broth flow passes through the bores of porous hydrophobic polymeric hollow fibers and a vacuum is established on the shell side of the hollow fibers.

In a further aspect of the present disclosure, polypropylene based hollow fibers are impregnated with tri-n-octylamine (TOA) which then functions as a supported liquid membrane. The thickness of the TOA liquid membrane may be advantageously reduced to allow for higher flux passage through the membrane while retaining high selectivity. Alternative materials that may be advantageously employed to impregnate the disclosed hollow fibers include tri-laurylamine and tri-decylamine.

In a further exemplary embodiment, polypropylene based hollow fiber supported liquid membranes are coated with a thin layer of polymeric material. The thin coating layer is of sufficient hydrophobicity, pore size, thickness and porosity to prevent (or substantially prevent) wetting by the liquid membrane or by the fermentation broth, thus allowing the passage of vapor while eliminating (or substantially eliminating) membrane degradation or fermentation broth contamination. In an exemplary embodiment, the coating is a nano-porous fluorosilicone.

Still further, exemplary embodiments of the present disclosure include the addition of a third component to a binary system so as to achieve better separation between the two principal components. In preferred embodiments, a small amount of n-butanol may be added to a solution containing ethanol, e.g., 5-10 wt % ethanol, to enhance the separation performance in extractive pervaporation using tri-n-octylamine (TOA) as the liquid membrane with coated porous hollow fibers. Through such technique, the selectivity of ethanol is substantially increased to as much as 113 at 54° C. for a feed containing ~10 wt % ethanol when 2.5 wt % n-butanol is added to the feed, as compared with the selectivity of ethanol without any n-butanol added, namely, 38. Addition of n-butanol in the manner described herein can advantageously increase the solubility of ethanol in the liquid membrane, increase the diffusivity of ethanol, and change the activity coefficients of various species.

In an additional exemplary embodiment, the apparatus and systems of the present disclosure are used in pervaporation process(es). The pervaporation process may be advantageously used to remove volatile organic compounds (VOCs) from wastewater streams. By way of example, the waste water streams may be generated as a result of a previously performed fermentation process.

Additional features, functions and benefits of the disclosed apparatus, systems and methods will be apparent from the description which follows, particularly when read in conjunction with the accompanying figures.

BRIEF DESCRIPTION OF THE DRAWINGS

To assist those of ordinary skill in the relevant art in making and using the subject matter hereof, reference is made to the appended drawings, wherein.

DESCRIPTION OF EXEMPLARY EMBODIMENT(S)

Figure 1:
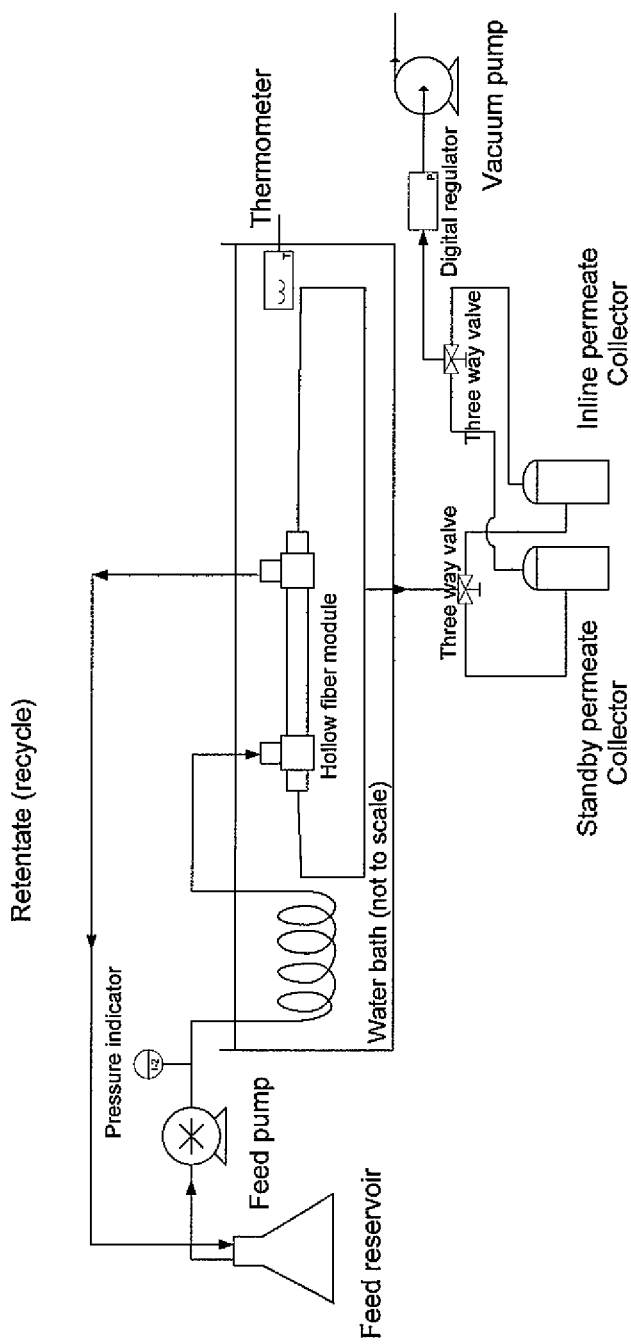
FIG. 1 is a representation of an experimental setup for supported liquid membrane-based pervaporation process.
Figure 2:
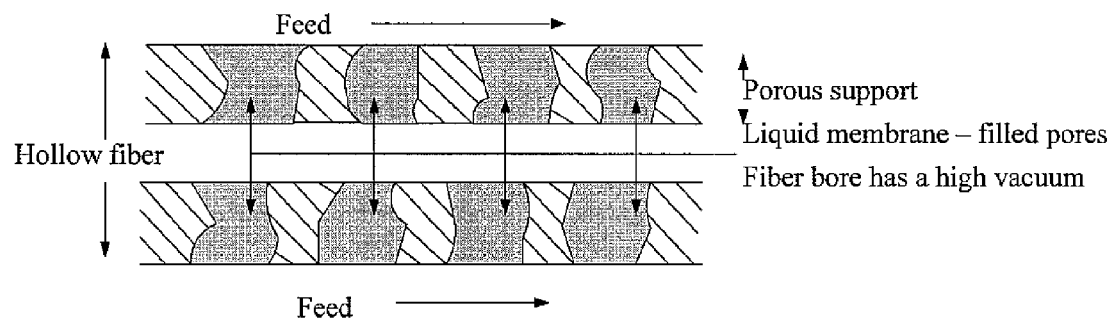
FIG. 2 is a representation of a porous hollow fiber membrane without any coating. The pores of the hollow fiber membrane are completely filled by a liquid membrane.
Figure 3:
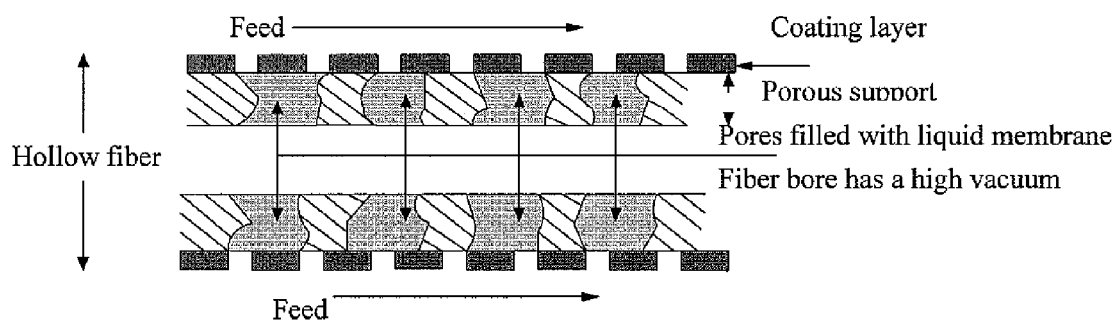
FIG. 3 is a representation of a porous hollow fiber membrane with a hydrophobic nanoporous coating. The pores of the substrate hollow fiber membrane are completely filled by a liquid membrane. The nanoporous coating pores do not have any liquid membrane.
Figure 4:
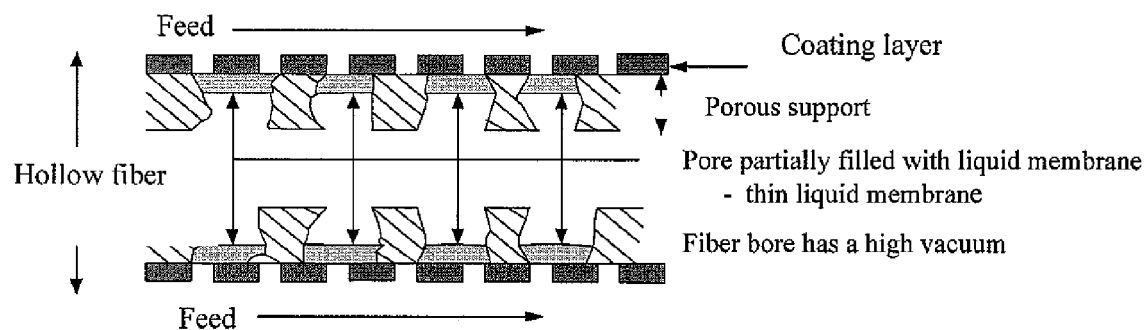
FIG. 4 is a representation of a porous hollow fiber membrane with a nanoporous coating. The pores of the substrate hollow fiber membrane are partially filled by a liquid membrane.

In an exemplary embodiment of the present disclosure, a coated porous polypropylene based hollow fiber membrane is provided that contains a liquid membrane. Another embodiment of the present disclosure facilitates reduction in the thickness of the liquid membrane. An advantageous application of the disclosed apparatus, systems and methods related to the removal of volatile organic compounds (VOCs) from wastewater streams. These wastewater streams may be the result of industrial processes, in particular fermentation processes. Embodiments of the present disclosure are particularly useful in applications where a pervaporation technique is used to remove volatile organic compounds (VOCs) from a dilute solution, such as a fermentation broth.

An exemplary embodiment of the present disclosure includes a polypropylene based hollow fiber impregnated with tri-n-octylamine (TOA) as a supported liquid membrane (SLM). The TOA SLM in the coated hollow fibers demonstrates a high selectivity and reasonable/acceptable mass fluxes of solvents in removal processes, such as pervaporation. The thickness of the TOA liquid membrane can be reduced to allow for higher flux passage through the membrane while retaining high selectivity.

In an exemplary embodiment, the polypropylene based hollow fiber supported liquid membrane is coated with a thin layer of material. The coating material is nanoporous and has a pore size significantly smaller than the pore size of the polypropylene substrate. The thin coating layer is of sufficient hydrophobicity, pore size, thickness and porosity to prevent (or substantially prevent) wetting by the liquid membrane, thus allowing the passage of vapor while eliminating (or substantially eliminating) membrane degradation. In a further exemplary embodiment, the coating is a nanoporous fluorosilicone.

In a further aspect of the present disclosure, butanol may be added to the liquid feed solution to increase the selectivity of the supported liquid membrane.

In an exemplary embodiment, the apparatus, systems and methods of the present disclosure are used in a pervaporation process. In a further embodiment, the pervaporation process is used to remove volatile organic compounds (VOCs) from wastewater or process streams. By way of example, the wastewater or process streams may be generated as a result of a previously performed fermentation process.

In an exemplary method for immobilizing a liquid membrane in the disclosed hollow fiber material, the following steps may be employed: First, the liquid membrane material is introduced into the fiber bores, e.g., by a peristaltic pump, causing the liquid to spontaneously fill the pores. Liquid circulation is continued for a period of time, e.g., about 20 minutes. Subsequently, the excess liquid membrane on the shell side is removed, e.g., by draining. Thereafter, the excess liquid membrane on the lumen side is removed, e.g., by passing clean air at a low pressure for about 2-3 hours.

A further embodiment of the present disclosure facilitates a reduction in the thickness of an immobilized liquid membrane. Such reduction may be achieved, for example, according to the following steps: First, a liquid membrane material is mixed with a highly volatile diluent, e.g., hexane. Second, the mixture of the liquid membrane material and diluent is immobilized in the membrane pores, e.g., via the immobilization technique described above. Third, clean air is passed at a low pressure through the shell side of the fiber, causing the diluent to evaporate. Due to its high vapor pressure, the diluent will evaporate leaving a thinner liquid membrane in the pores of the hollow fiber.

The present disclosure is further illustrated by the following experiments. However, it is to be understood that the examples/experiments presented herein are not intended to be limiting, but rather illustrative, of the scope of the present disclosure.

Experimental Procedure Relating to an Exemplary Embodiment of the Present Disclosure Chemicals Acetic acid (HAc) (99.5% glacial) (Acros Organics); tri-n-octylamine (TOA: 95% GC) (Fluka); ethanol (97% Denatured), acetone (99%), butanol (99%) (Fisher Scientific); liquid $N_2$ (Welco CGI).

Hollow Fiber Membranes and Modules

Hollow fiber membrane modules were fabricated in a laboratory using translucent PTFE tubing as the shell of the hollow fiber module. Initially, microporous hydrophobic polypropylene hollow fiber membranes (X-10, X-20) were obtained from a manufacturer (Celgard Inc., Charlotte, N.C.) and used as a liquid membrane support. Next, porous hydrophobic polypropylene hollow fibers having a nanoporous fluorosilicone coating on the outside diameter of the fibers were obtained from Applied Membrane Technology Inc. (AMT), Minnetonka, Minn. The porous hydrophobic polypropylene hollow fibers coated with fluorosilicone on the outside of fibers were characterized by very small pores in the coating, thereby making them nanoporous. Indeed, the pore size of the coating was much smaller than the pore size of the polypropylene substrate. Such structure was filled with the liquid membrane in the pores of the substrate. The details of membranes and the modules are provided in Table 1 below.

TABLE 1

| Details of hollow fiber membranes and modules | | | | | |
|---|---|---|---|---|---|
| Module number | 3 | 5 | 11 | 12 | 13 |
| Membrane type | Polypropylene (X - 10)* | Polypropylene (X - 20)* | Coated polypropylene** | Polypropylene (X - 20)* | Coated polypropylene** |

TABLE 1-continued

Details of hollow fiber membranes and modules

| Module number | 3 | 5 | 11 | 12 | 13 |
|---|---|---|---|---|---|
| Characteristic | Porous | Porous | Porous having a fluorosilicone coating on O.D. | Porous | Porous having a fluorosilicone coating on O.D. |
| Number of fibers | 30 | 30 | 36 | 36 | 36 |
| Porosity | 0.3 | 0.3 | 0.45 | 0.3 | 0.45 |
| O.D.*** (μm.) | 290 | 290 | 380 | 400 | 380 |
| I.D.*** (μm.) | 240 | 240 | 280 | 350 | 280 |
| Effective length (cm.) | 15.5 | 16.00 | 13.0 | 16.0 | 17.5 |
| Mass transfer area (cm$^2$) | 37.3 | 39.8 | 42.63 | 72.38 | 49.48 |
| Shell details | ¼ in O.D. plastic tube | ¼ in O.D. plastic tube | ⅜ in O.D. plastic tube | ⅜ in O.D. plastic tube | ⅜ in O.D. plastic tube |

*Obtained from Celgard Inc. Charlotte, NC
**Obtained from Applied Membrane Technology Inc., Minnetonka, MN
***O.D. (outside diameter); I.D. (inside diameter)

Liquid Membrane Immobilization Technique: Lumen-Side Immobilization

Lumen-side immobilization was performed using tri-n-octylamine (TOA). Through the tube side of the module, the liquid membrane material (TOA) was introduced into the fiber bore by a peristaltic pump; this liquid spontaneously filled the pores of the hydrophobic hollow fiber. In the case of porous fibers without any coating, the liquid membrane wetted the fiber wall and penetrated the shell side. The liquid circulation was continued for around 20 minutes; then excess liquid membrane in the shell side was removed by draining. The excess liquid membrane on the lumen side was removed by passing clean air at a low pressure, about 3 psig (20 kPa), for about 2-3 hours. The module was kept overnight and the supported liquid membrane (SLM) in the pores was tested via $N_2$ permeation (described below).

Reduced Thickness of TOA as a Supported Liquid Membrane

The procedure described above developed a supported liquid membrane spanning the length of the pores of the substrate wetted by TOA. The thickness of TOA as the SLM in the pore can be reduced by using a mixture of TOA and hexane as a diluent. The mixture of TOA and hexane was immobilized in the membrane pores via the immobilization technique described above. The subsequent passage of clean air at a low pressure through the shell side leads to evaporation of hexane. Hexane evaporates due to its very high vapor pressure and leaves a thinner TOA liquid membrane in the pores of hollow fiber substrate on the outer diameter side. It is noted that the foregoing procedure was carried out with the coated hollow fiber, where the nanopores of the coating were not wetted by the mixture of TOA and hexane. The module was tested with $N_2$ for gas permeation for this thin LM.

Gas Permeation Technique

The module with and without the liquid membrane in the pores of the hollow fiber substrate was connected to a gas cylinder ($N_2$) and a bubble flow meter, which functioned as the testing system. The gas cylinder was connected to one end of the module tube side; the other tube side end was kept closed. One of the openings on the module shell side was closed and a bubble flow meter was attached to the other shell side opening of module.

The $N_2$ permeance of the TOA liquid membrane in the wall of the hollow fiber substrate was calculated by measuring the steady-state permeation rate of nitrogen through the membrane via $$\frac{Q_{N_2}}{\delta_m}(\text{cm}^3(STP)/\text{cm}^2 \cdot \text{sec} \cdot \text{cmHg}) = \frac{P_1 \overset{0}{V}_1^2 T_{STP}}{P_{STP} T_1 \cdot A \cdot \Delta P_{N_2}} \quad (1)$$

where $T_{STP}$=273.15 K, $P_{STP}$=760 mmHg, $\Delta P_{N_2}$ is the pressure difference across the membrane, A is the membrane area based on fiber internal diameter, $P_1$, is atmospheric pressure, $\overset{0}{V}_1$ $V_1$ is the volumetric flow rate of gas though the membrane during measurement at room temperature, and $Q_{n_2}$ is the permeability coefficient of $N_2$ permeation through the membrane of effective thickness $\delta_m$. The same formula was used when there was no liquid membrane.

Experimental Procedure for Exemplary Pervaporation Process

The experimental procedure described herein is somewhat similar to the technique described by Qin et al. [Y. Qin et al., *Pervaporation Membrane that are Highly Selective for Acetic Acid Over Water*, Ind. Eng. Chem. Res., 42 (2003) 582-595]. Feed solution containing different solvents (acetone, ethanol, butanol and acetic acid) was introduced at a constant flow rate into the shell side of the module from a reservoir by a Masterflex peristaltic pump. The tube side of the hollow fiber module was maintained under vacuum by a Welch GEM 1.0 vacuum pump. The vacuum level was monitored by a J-KEM Scientific digital vacuum regulator (model 200) and controlled by a needle valve attached to the bypass loop of the regulator. Two glass vacuum traps were immersed in liquid $N_2$ Dewar flasks and connected to the vacuum pump to collect the permeate vapor.

The hollow fiber module containing the liquid membrane in the pores was attached to the pervaporation system, as shown in FIG. 1. After the shell side of the module was completely filled with the feed solution, the vacuum pump was started, and the permeate side was evacuated gradually (approximately 10-15 minutes). When the lumen side was stable at around a preset pressure between 3-5 Torr (mm Hg), the vacuum traps were immersed in a liquid $N_2$ well to collect the permeate vapors by condensation.

Permeate Sampling

Permeate vapors were collected for a fixed interval of time, usually eight to ten hours, in the attached vacuum trap. The vacuum traps were immersed in the liquid $N_2$ Dewar flasks to stabilize permeate sample by quenching to a solid state. There were two vacuum traps, one used as the inline permeate collector and another one as the standby permeate collector.

When the sample was collected for the desired time in the inline permeate collector, the permeate sample was directed to the standby permeate collector by switching two (2) three-way valves from inline permeate collector to the standby permeate collector. The sample in the inline vacuum trap was removed from the liquid $N_2$ Dewar flask, thereby raising its temperature to room temperature and melting the solid permeate sample into the liquid state. The permeate sample was analyzed by a gas chromatograph (Model HP 6890 and HP 5890, Agilent, Wilmington, Del.) equipped with a 10% AT-1000 on Chromosorb W-AW, 80/100 packed column (Altech, Deerfield, Ill.) and another gas chromatograph (Model CP 3800, Varian Walnut Creek, Calif.) equipped with DB 5 ms column (Agilent, Wilmington, Del.). The conditions of analysis were: 70° C. for 5 minutes, the oven temperature was raised to 140° C. at rate 35° C./minute, and then temperature was kept at 140° C. for 10 minutes.

Tri-N-Octylamine Analysis

The amount of tri-n-octylamine in an aqueous solution can be determined by chloroform extraction [see, e.g., G. M. Ritcey et al., *Solvent Extraction: Principles and Applications to Process Metallurgy*, Part 1, Elsevier, N.Y., 1984]. An aqueous sample of 10 ml volume was taken into the flask; then, 15 ml of water was added. A small amount of sulfuric acid solution was added to the flask until the pH of the solution dropped to between 1 to 3 before adding 1.0 ml of bromophenol blue to the flask and shaking it well. Next, 10 ml of chloroform was introduced to the flask and the flask was shaken vigorously to ensure that the chloroform extracted all of the amine from the aqueous phase. Then, the two phases were separated. The absorbance of the organic phase (chloroform) was measured in 1 cm. quartz cuvet at 410 nm, against a blank solution (water without any dissolved amine). Calibration curves were developed using a standard solution containing amine (TOA) 100 μg with 15 ml of water (7.5 ppm of TOA in water, which is the solubility of TOA in water). The basis of this extraction-based analysis is the tendency of the tertiary amine to form an amine salt with the acid, a polar ion-pair, which is then extracted into the organic phase [see, e.g., G. M. Ritcey et al.].

ABE Fermentation and Pervaporation of Filtered Fermentation Broth: Culture and Inoculum Preparation

*C. acetobutylicum* ATCC 824 was obtained from American Type Culture Collection (Rockville, Md.) as spores. Inoculum was prepared as follows, 1.9 g DIFCO Reinforced *Clostridium* Medium (Becton Dickinson Microbiology System, Sparks, Md.) was dissolved in 50 ml warm water. To the solution was added 0.6 g of glucose; the solution was then autoclaved for 15 min at 121° C. followed by cooling to 75° C. An amount of 15-18 ml of the solution was taken for adding 0.1 ml of inoculum and heated to 75° C. for 2 min and followed by cooling in ice-cold water for 1 min. The heat shocked spores were incubated in an anaerobic incubator at 35° C. for 18-24 hr. When growth appeared, a small amount of cell culture (5-10 ml) was transferred to 100 ml of medium which consisted of glucose 30 g/l, yeast extract 5 g/l, ammonium acetate 2 g/l, sodium chloride 1 g/l, $KH_2PO_4$ 0.75 g/l, $K_2HOP_4$ 0.75 g/l, cysteine $HCl.H_2O$ 0.5 g/l, $MgSO_4$ 0.20 g/l, $MnSO_4.7H_2O$ 0.01 g/l, and $FeSO_4.7H_2O$ 0.01 g/l. Before inoculation, the medium was filtered through 0.5 μm filter and autoclaved at 121° C. for 15 min, then cooled to 35° C. in an anaerobic incubator for 20-24 hr to allow the growth.

Fermentation

Fermentation was carried out in a Virtis Omni-Culture fermentor (Gardiner, N.Y.) using the above medium with 40 g/l glucose. The fermentor containing 1 liter medium was autoclaved at 121° C. for 15-17 min and cooled down to 35° C. The actively growing culture (70-90 ml) was added to the fermentor and kept under anaerobic condition. When the culture started producing its own gas, sweeping nitrogen gas across the medium surface was stopped. During growth, the pH drop was controlled at 5 by using 5.0 N NaOH. The pH probe was sterilized using 50% ethanol and deionized water before inserting it into fermentor. The fermentation was stopped after 72-96 hours. At the end of the fermentation, the fermentation broth was filtered through 0.5 μm flat sheet filter. The filtered fermentation broth was ready to be used as the feed for the pervaporation process.

DEFINITIONS AND CALCULATION PROCEDURES

The membrane selectivity of the solvent over water is defined by $$\alpha_{solvent/H_2O} = \left( \frac{\frac{\text{solvent weight fraction in the permeate}}{\text{solvent weight fraction in the feed}}}{\frac{\text{water weight fraction in the permeate}}{\text{water weight fraction in the feed}}} \right) \quad (2)$$

The molar fluxes of solvents and water can be described as $$J_{solvent} = K_{solvent}(\gamma_{solvent} x_{solvent} P^*_{solvent} - p_{solvent,perm}) \quad (3a)$$

$$J_{H_2O} = K_{H_2O}(\gamma_{H_2O} x_{H_2O} P^*_{H_2O} - p_{H_2O,perm}) \quad (3b)$$

where $P^*_{solvent}$ and $P^*_{H_2O}$ are the vapor pressures of solvent and water respectively in equilibrium with the liquid feed. The quantities $p_{solvent,perm}$ and $P_{H_2O,perm}$ are the partial pressures of solvent and water in the lumen (vacuum) side; these parameters depend to some extent on the preset permeation side pressure. The overall mass transfer coefficients are $K_{solvent}$ and $K_{H_2O}$ where $$K_{solvent} = \frac{Q_{solvent}}{\delta_m}; K_{H_2O} = \frac{Q_{H_2O}}{\delta_m} \quad (3c)$$

where $Q_i$ and $\delta_m$ are the permeability coefficient of species i and membrane thickness respectively. From any experiment, the mass flux was calculated from $$j_i = \frac{\text{mass of } i \text{ permeated through the membrane (g)}}{\text{time (hr)} \times \text{membrane area (m}^2\text{)}} \quad (4)$$

During the liquid membrane immobilization process, any difference between the process in the uncoated fibers and coated fibers was observed. The TOA liquid membrane penetrated from the fiber bores in the lumen side to the shell side of the module easily for uncoated fibers. On the other hand, a very small amount of the liquid membrane came through to the shell side in the case of coated fibers (as was observed through the translucent plastic shell casting of the module)

with a few drops on the fiber O.D. This result is reasonable because the uncoated fibers are highly porous and their pore size is much larger. The critical surface tension of polypropylene is ~30 dyne/cm, whereas the surface tension of TOA is somewhat less than this value (28.5 dyne/cm), so that pore wetting is spontaneous.

However, in the case of the coated fibers, the small amount of TOA that came through to the shell side is believed to have passed through coating defects. There is a possibility of TOA wetting of the nanopores of the coating, although such phenomenon is highly unlikely since the critical surface tension of the coating material is less than 20 dyne/cm. The coated layer in the fluorosilicone coated fibers was also nanoporous with very fine pore size. Therefore, the liquid membrane could not readily permeate to the shell side unless the applied pressure applied was significant. Therefore, pressure control during pore wetting by TOA is important. The fermentation broth cannot wet these pores either; however, solvents from the fermentation broth are evaporated through these pores and come into contact with the liquid membrane. The support membrane structure can thus eliminate the loss of liquid membrane to the feed liquid during the pervaporation process and prevent contamination of the fermentation broth by the solvent used as the liquid membrane.

$N_2$ permeation data are shown in Table 2 below. An important item is the $N_2$ permeation rate through the thin liquid membrane, which was 3.5 times larger (for the 30% TOA module—hexane making up the remainder). The data in Table 2 clearly show that the liquid membrane thickness in the pores has been reduced to less than/$1;3^{rd}$ of the full membrane wall thickness.

TABLE 2

$N_2$ permeance of fibers with and without coating, tested before and after immobilization of liquid membrane.

| Module | Characteristic | Liquid membrane | Permeance: $Q(cm^3/cm^2 \cdot sec \cdot cmHg)$ Before immobilization | After immobilization |
|---|---|---|---|---|
| 12 | Porous | 100% TOA | $5.93 \times 10^{-3}$ | $2.20 \times 10^{-7}$ |
| 11 | Fluorosilicone coated | 100% TOA | $2.48 \times 10^{-3}$ | $1.50 \times 10^{-7}$ |
| 13 | Fluorosilicone coated | 30% TOA/70% hexane * | $2.56 \times 10^{-3}$ | $5.40 \times 10^{-7}$ |

* Hexane evaporated to obtain thinner membrane

Performance of TOA Liquid Membrane with Uncoated Polypropylene Hollow Fibers as Support for Organic Solvent Species In the reported experiments, solutions containing 1.0% of either acetone or ethanol in water by weight were used at room temperature (25° C.). The permeate side acetone concentration was 62.8 wt % which yielded a value of 167 for selectivity and a mass flux of 4.5 g/m² hr. In the ethanol solution tests, the ethanol selectivity achieved was 15 and the mass flux was 0.6 g/m² hr. The selectivity of ethanol was close to the result obtained by Matsumura et al. using oleyl alcohol as the liquid membrane [see, M. Matsumura et al., *Separation of dilute aqueous butanol and acetone solutions by pervaporation through liquid membranes*, Biotechnol. Bioeng. 30 (1987) 1991-1992]; however, the selectivity of acetone according to the present disclosure is considerably higher than the results obtained using oleyl alcohol.

A solution of acetic acid was also tested with TOA on a porous hollow fiber support. A selectivity of 2.1 was obtained for acetic acid at room temperature and 4.0 wt % in the feed. These values are on the low side of the results from Qin et al. [see, Y. Qin et al., *Pervaporation Membrane that are Highly Selective for Acetic Acid Over Water*, Ind. Eng. Chem. Res., 42 (2003) 582-595]. The results are summarized in Table 3.

TABLE 3

Pervaporation performance of TOA liquid membrane with porous hollow fiber as support for single organic solute/solvent in aqueous feed[+]

| Feed | Feed concentration (wt %) | Permeate concentration (wt %) | Selectivity | Mass flux (g/m²/hr) |
|---|---|---|---|---|
| Acetone solution* | 1.0 | 62.8 | 167.8 | 4.6 |
| Ethanol solution* | 1.0 | 13.30 | 15.2 | 0.6 |
| Acetic acid solution** | 4.0 | 8.0 | 2.1 | 5.4 |
| Butanol solution*** | 1.5 | 62.3 | 108.4 | 6.4 |
| Butanol solution*** | 2.0 | 72.0 | 126.4 | 8.2 |
| Butanol solution*** | 2.5 | 78.3 | 141.2 | 10.0 |

Figure 5A:
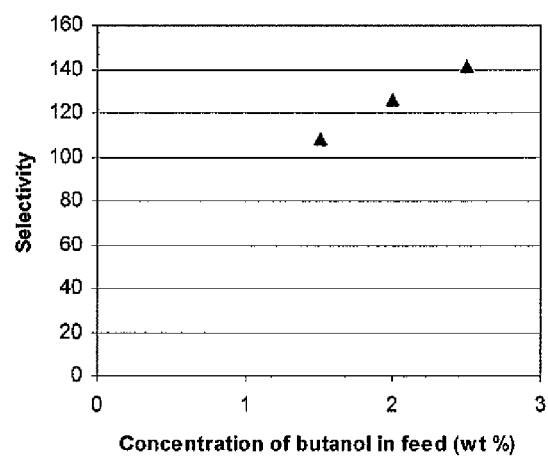
FIGS. 5A and 5B are graphical representations of influence of concentration in feed for butanol on selectivity and permeation flux, respectively.
Figure 5B:
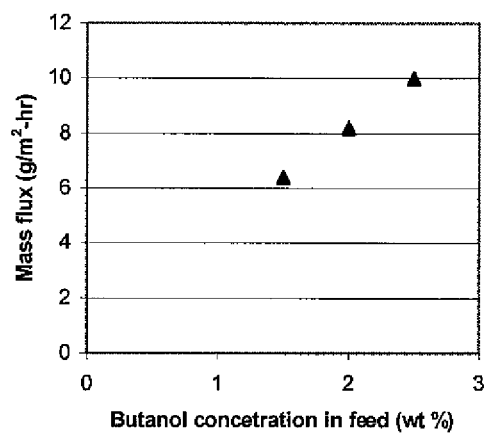

[+]Feed temperature 25 C.; Vacuum level 3.2 torrs unless stated otherwise
*Porous polypropylene hollow fiber as a support (X-20): module 5
**Porous polypropylene hollow fiber as a support (X-10): module 3
*Porous polypropylene hollow fibers as a support (X-20): module 5; Vacuum level 3.5 torrs Butanol solutions were next tested using butanol concentration varying between 1.5 and 2.5 wt % at room temperature. The selectivity of butanol increased from 108 to 141 as butanol concentration was increased from 1.5-2.5 wt % in feed (as shown in FIG. 5**). From experiments with butanol at different concentrations in feed, both the flux and selectivity of butanol were increased as the feed butanol concentration was increased. These results have also been summarized in Table 3. A higher driving force due to a higher weight fraction of butanol in feed contributed to a higher partial pressure of butanol in feed and a higher flux. However, the very high selectivity indicates that n-butanol solubility in TOA must be much greater than that of the more polar solvent ethanol.

Results for a Mixture of Compounds in Feed

Two feed solution concentrations were tested with TOA as the liquid membrane in a porous polypropylene hollow fiber support at room temperature. The selectivity of butanol, acetone and ethanol achieved for solution 1 were 104, 75 and 40, respectively, as shown in Table 4. The selectivities of all species with solution 2 were lower, since butanol concentration in the feed was lower. FIG. 5 indicates that higher butanol concentration in the feed translates to higher butanol solubility in the membrane, implying potentially higher solubility of other polar species, e.g., acetone and ethanol, due to coextraction and higher selectivities.

Results for Feed at Different Temperatures

Figure 6A:
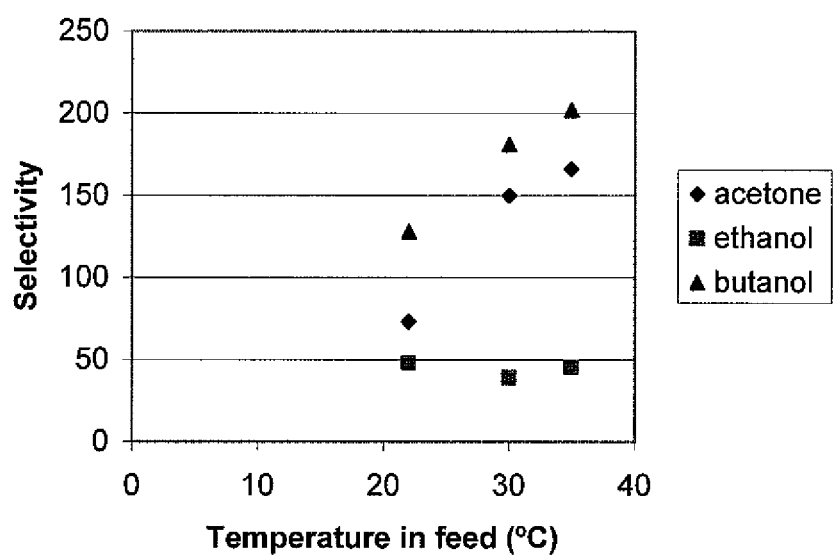
FIGS. 6A and 6B illustrate the performance of tri-n-octylamine (TOA) as a liquid membrane with hollow fiber as the support with mixtures at different temperatures in regards to selectivity and mass flux, respectively. (Module 5, pure TOA as liquid membrane, feed concentration of acetone, ethanol and butanol are 0.7, 0.5 and 1.7 wt % respectively.)
Figure 6B:
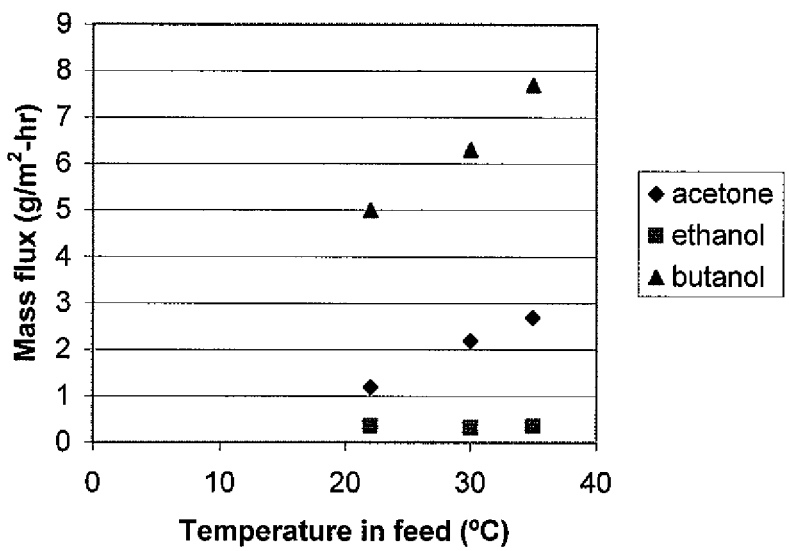

Data from temperature variation studies were obtained from 22° C. to 35° C. and are illustrated in FIG. 6. The selectivity and fluxes of all solvents increased as the temperature was increased. Possible reasons for such a behavior are discussed below.

TABLE 4

Selectivity and mass fluxes obtained from a mixture of different components in feed with TOA as a liquid membrane

| Solution | Selectivity | | | Flux (g/m² h) | | |
| --- | --- | --- | --- | --- | --- | --- |
| | Acetone | Ethanol | Butanol | Acetone | Ethanol | Butanol |
| Solution 1[a] | 75 | 40 | 104 | 2.6 | 1.1 | 10.7 |
| Solution 2[b] | 68 | 31 | 71 | 2.1 | 0.7 | 8.3 |

[a]model solution acetone 0.69 wt %, ethanol 0.54 wt %, butanol 1.97 wt %
[b]model solution acetone 0.45 wt %, ethanol 0.31 wt %, butanol 1.64 wt %
Remarks:
1) Feed temperature 25° C.; Vacuum level 2.9 torrs.
2) TOA as a liquid membrane
3) Porous polypropylene hollow fiber as a support (X-20): module 12

Figure 7A:
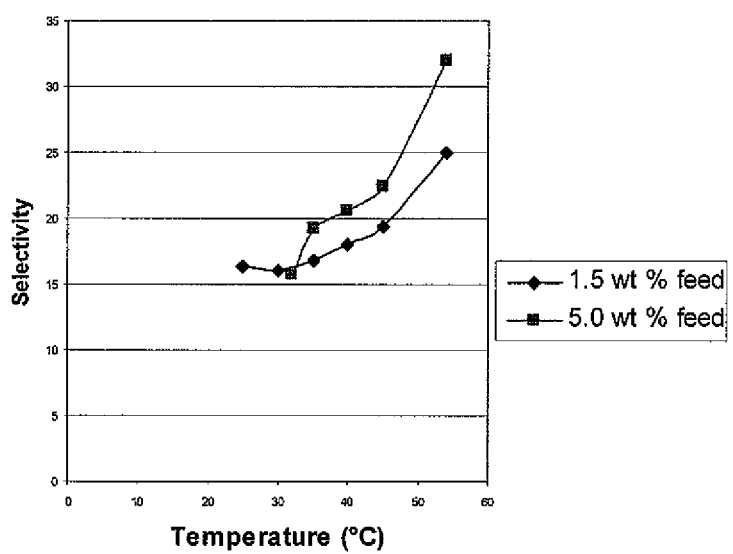
FIGS. 7A and 7B illustrate the selectivity and flux of ethanol, respectively, at various temperatures for two feed concentration levels. (Module 11, pure TOA as liquid membrane.)
Figure 7B:
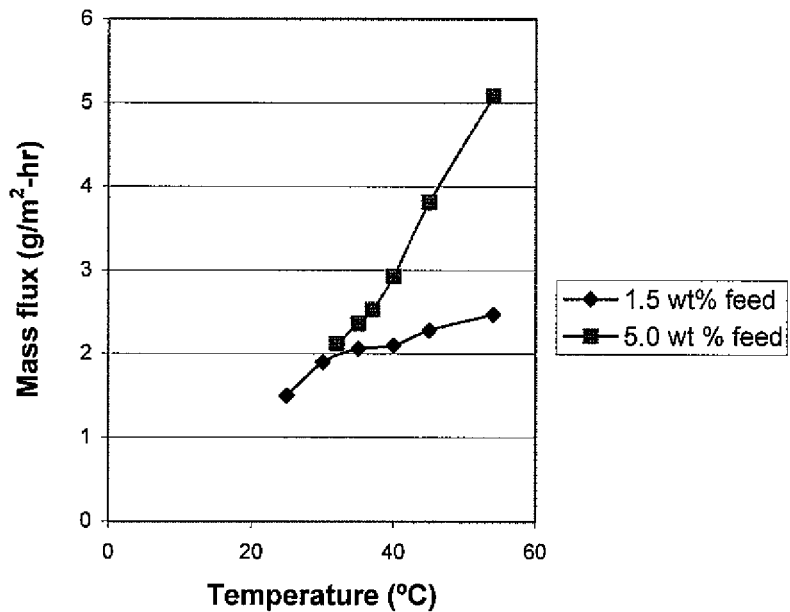

Performance of TOA Liquid Membrane Using Porous Fluorosilicone Coated PP Fibers: Single Organic Solvent Species in Solution The following experiments employed individual solutions of ethanol or butanol at different feed concentrations and temperatures. FIG. 7 illustrates the selectivity and flux of ethanol at various temperatures for two feed concentration levels. The selectivity of ethanol goes up to 32 at a feed temperature of 54° C. and 5.0 wt % ethanol in feed. As expected, higher ethanol feed concentration results in a higher selectivity and mass flux due to higher driving force for the pervaporation of ethanol through the liquid membrane. However, the selectivities achieved are significantly lower than those shown in FIG. 6 (achieved in the presence of butanol). This result supports the conclusion that the presence of butanol enhances ethanol selectivity due to its increased solubility.

The performance of TOA as the liquid membrane was also tested with butanol solutions at various temperatures. The selectivity of butanol was found to be as high as 162 and the permeate mass flux of butanol could reach 1.0 g/m² hr at 54° C. The selectivity of butanol obtained with TOA as the active membrane is quite high compared with results from mixed matrix membranes [N. Qureshi et al., *Acetone Butanol Ethanol (ABE) Recovery by Pervaporation Using Silicalite-Silicone Composite Membrane From Fed-Batch Reactor of Clostridium Acetobutylicum*, J. Membrane Sci., 187 (2001) 93-102] or even the results from using silicone membrane [e.g., W. J. Groot et al., *Pervaporation for simultaneous product recovery in the butanol/isopropanol batch fermentation*, Biotechnol Lett., 6(11) (1984) 709-714; W. J. Groot et al., *Increase of substrate conversion by pervaporation in the continuous butanol fermentation*, Biotechnology Lett., 6(12) (1984) 789-792; and M. A. Larrayoz et al., *Study of butanol extraction through pervaporation in acetobutylic fermentation*, Biotechnol Bioeng., 30 (1987) 692-696].

Figure 8A:
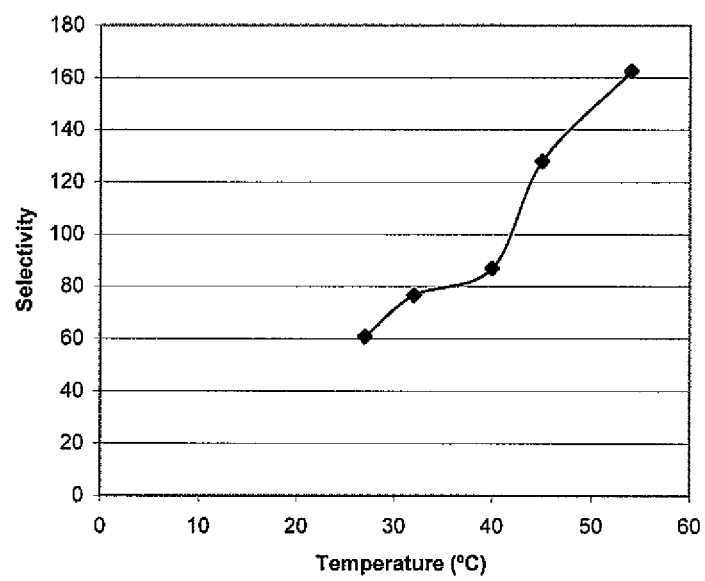
FIGS. 8A and 8B illustrate butanol-water selectivity and butanol permeation flux, respectively, at different temperatures. (Module 11; pure TOA as liquid membrane; feed concentration 1.5 wt %).
Figure 8B:
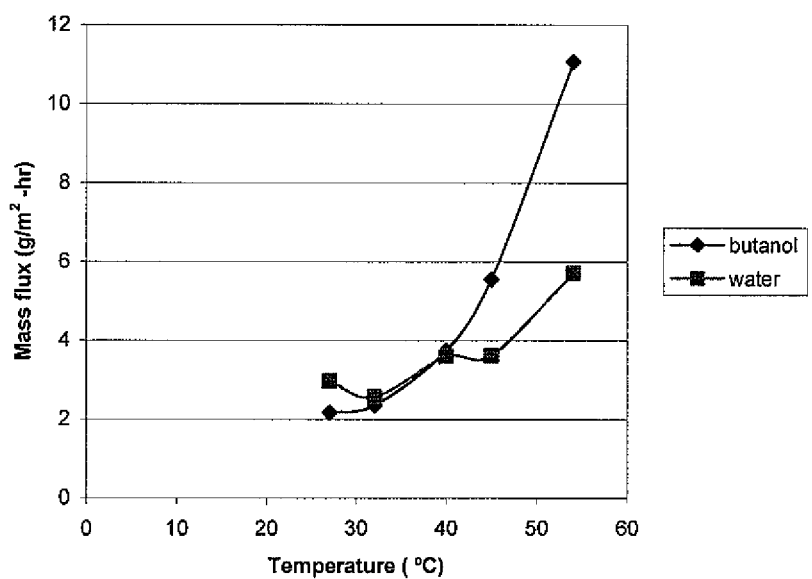

FIG. 8 illustrates butanol selectivity and butanol flux at different temperatures.

Mixtures of Acetone, Butanol, and Ethanol

Figure 9A:
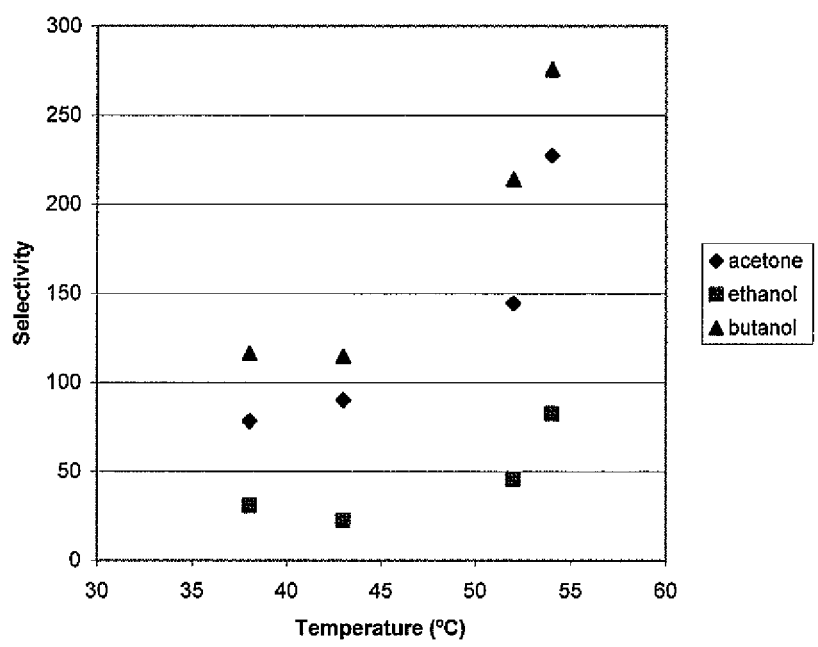
FIGS. 9A and 9B show TOA selectivity and mass flux performances, respectively, as the liquid membrane with coated hollow fibers as the support at different temperatures. (Module 11, pure TOA as liquid membrane, feed composition: acetone 0.8 wt %, ethanol 0.5 wt %, butanol 1.5 wt %.)
Figure 9B:
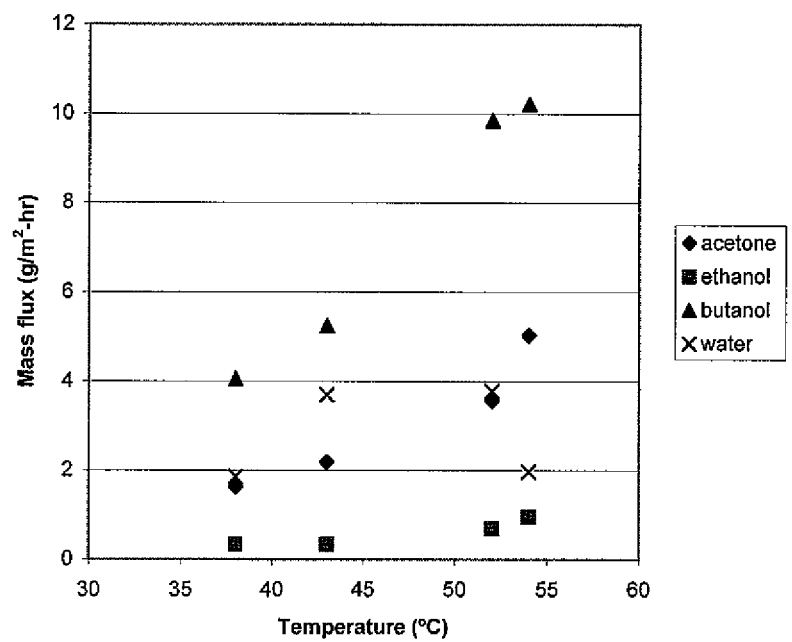

Experiments were carried out with the feed mixture at various temperatures up to 54° C. The selectivity and mass flux of solvents were increased at elevated temperatures, as shown in FIG. 9. The TOA-based liquid membrane displayed high performance in removing the solvents present at low concentration from aqueous solutions. The concentration of butanol in the permeate reached up to 67 wt % from an 1.5 wt % feed solution at 54° C. for the data shown in FIG. 9. The selectivity of butanol, acetone and ethanol went up to 275, 220 and 80, respectively, at 54° C. As in the experiments with single species solution, the selectivity and fluxes increased when the temperature is increased due to higher driving force, such as higher partial pressure and other factors discussed below. Especially noticeable is the dramatic increase in ethanol selectivity due to the presence of butanol in the feed solution (cf., FIG. 7).

Effect of Temperature

The coated fiber-based module 11 with TOA as the liquid membrane displayed considerable stability. Indeed, module 11 was used for many different experiments without any liquid membrane regeneration for a period of over six months. The cumulative time of testing was over 300 hours. However, pervaporation using the liquid membrane at a higher temperature was not tested due to concern about the thermal stability of the substrate membrane material. The highest temperature tested was 54° C., as illustrated in FIGS. 7-9.

Based on the noted results, it is apparent that a higher temperature translates to a higher solvent concentration in the permeate, higher solvent fluxes and higher solvent selectivities. When the temperature was increased, the vapor pressures of solvents and water increased, which resulted in a higher driving force for pervaporation, since the partial pressure of solvent in equilibrium with the solution on the feed side is almost proportional to the feed temperature. In addition to the increased driving forces, the higher temperature reduced the viscosity of the liquid membrane and thus increased the diffusivity of species through the liquid membrane. However, higher temperature decreases the solubility of solvents and water in the liquid membrane phase, which can reduce the fluxes of solvents and water in the permeate phase. From the results reported herein, it is apparent that the solvent fluxes increased with increasing temperature, which means that the effects from (i) the increased driving force due to the increased difference between equilibrium partial pressure on the feed side and the partial pressure on the permeate side (ii) the reduced liquid membrane viscosity, and (iii) the increased diffusivity, had greater influence than the influence of reduced solubility. At the same time, the solvent fluxes to the permeate side increased sharply with elevated temperature as compared with the fluxes for water, which caused greater solvent amounts to permeate to the vacuum phase as compared with water. This behavior contributed to higher solvent selectivities over water at elevated temperatures.

Effect of Coating on Species Flux

Figure 10:
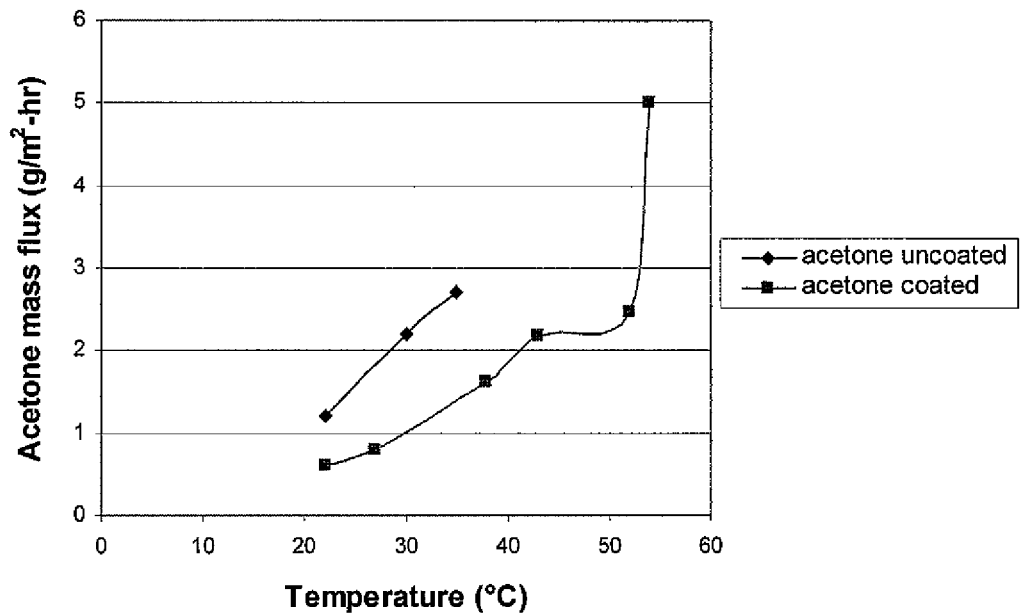
FIG. 10 illustrates acetone mass flux for tri-n-octylamine (TOA) as the liquid membrane with uncoated and coated hollow fibers as the support with a feed mixture at different temperatures. (Module 5 for uncoated fibers; pure TOA as liquid membrane; feed concentrations of acetone, ethanol and butanol are 0.7, 0.5 and 1.7 wt %, respectively. Module 11 for coated fibers; pure TOA as liquid membrane; feed composition: acetone 0.8 wt %, ethanol 0.5 wt %, butanol 1.5 wt %.)
Figure 11:
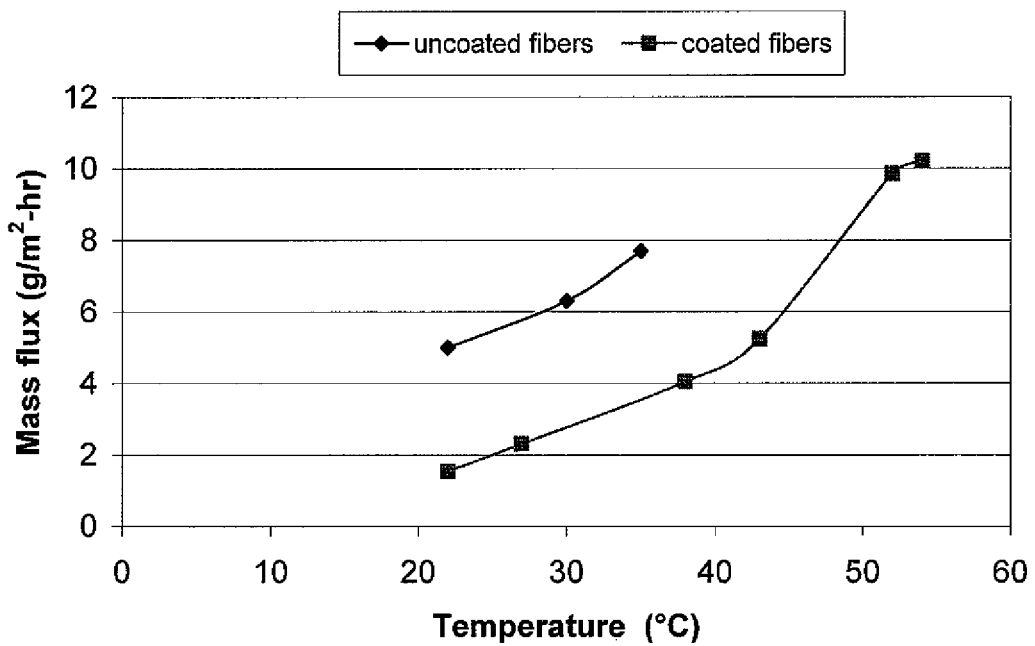
FIG. 11 graphically represents butanol mass flux for tri-n-octylamine (TOA) as the liquid membrane with uncoated and coated hollow fibers as the support with a feed mixture at different temperatures. (Module 5 for uncoated fibers; pure TOA as liquid membrane; feed concentration of acetone, ethanol and butanol are 0.7, 0.5 and 1.7 wt %, respectively. Module 11 for coated fibers; pure TOA as liquid membrane; feed composition: acetone 0.8 wt %, ethanol 0.5 wt %, butanol 1.5 wt %.)

The disclosed nanoporous coating provided exceptional life to the liquid membrane by preventing its loss to the feed aqueous solution. However, the species fluxes were reduced. In FIGS. 10 and 11, the individual fluxes of acetone and butanol are compared, respectively, for two situations, (i) support without coating and (ii) support with coating. For an intermediate temperature range of around 25-40° C., data indicate that the coating reduces the flux from anywhere between 1.3 to 1.9 times. This is consistent with $N_2$ permeation test results through the liquid membrane for coated and uncoated fibers. The $N_2$ permeance of the bare uncoated hollow fiber membrane was $$5.93 \times 10^{-3} \text{ cm}^3 (STP) / \text{cm}^2 \cdot \text{sec} \cdot \text{cmHg}$$

(module 12 was tested), whereas that of the coated hollow fiber membrane was $$2.56 \times 10^{-3} \text{ cm}^3 (STP) / \text{cm}^2 \cdot \text{sec} \cdot \text{cmHg}$$

(module 13 was tested). The value of $N_2$ permeance represents the total resistance encountered by the gas permeating through each membrane. Therefore, the solvent fluxes for coated fibers are also lower than those for uncoated fibers, which is reasonable.

Influence of Acetic Acid on Pervaporation Performance

Acetic acid has the potential to reduce the selectivities of all solvents due to increased water flux to the permeate side resulting from coextraction of water. Results are shown in FIG. 12.

Figure 12A:
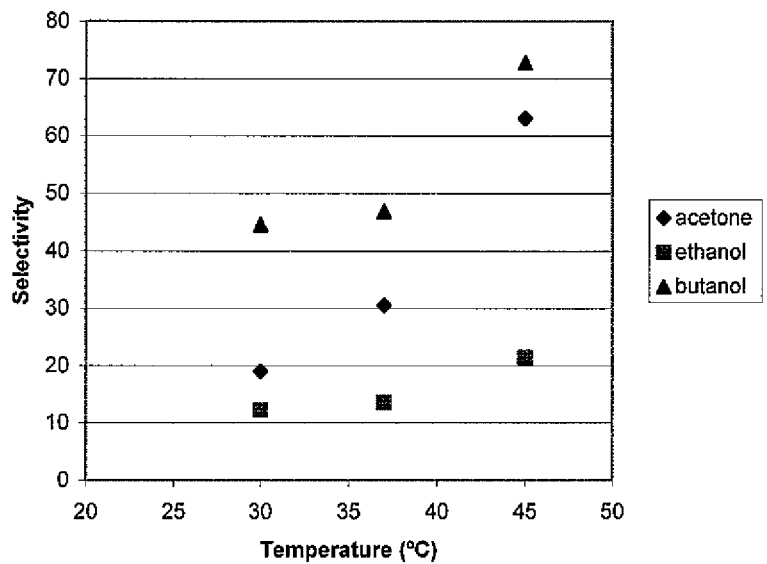
FIGS. 12A and 12B graphically represent pervaporation performance with respect to selectivity and permeate mass flux, respectively, with the addition of 0.5% acetic acid. (Module 11, pure TOA as liquid membrane; concentrations of acetone, ethanol and butanol were 0.8, 0.5 and 1.5 wt %, respectively.)
Figure 12B:
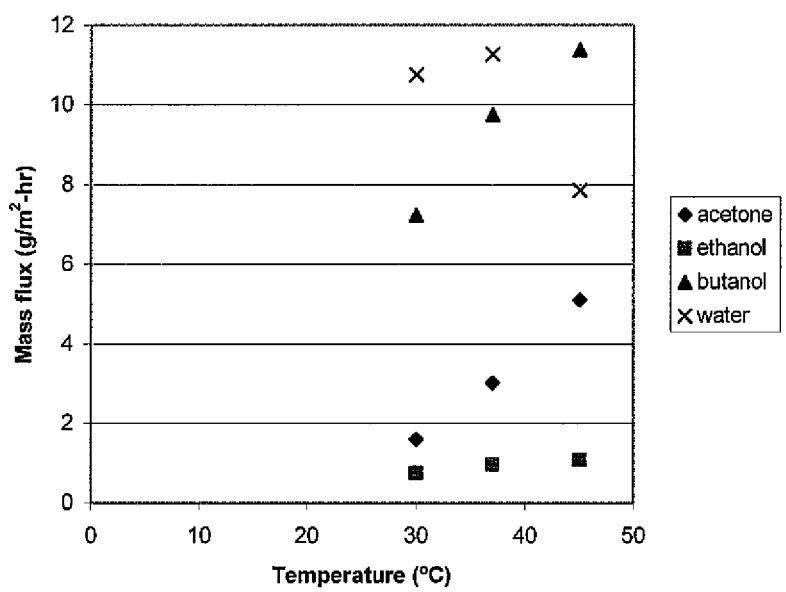

When the results of FIG. 12 are compared with those without any acetic acid in the feed solution, it is apparent that the solvent fluxes remain unchanged regardless of acetic acid presence in the feed side. However, the flux of water in the permeate side was much larger compared with that from experiments without acetic acid in the feed solution. This effect on water flux lowers the concentration of solvents in the permeate side and the selectivity of all solvent species. Solubility of water in pure TOA is very low (e.g., 0.040 mol/liter at 30° C.). Beyond the intrinsic solubility of water in TOA, water may enter the organic phase with a solute. In this case, acetic acid can act as a solute in the system. Acetic acid (i.e., $H^+Ac^-$) can react with the amine (i.e., $R_nNH_{(3-n)}$) to form a complex molecule as shown [27, 28]

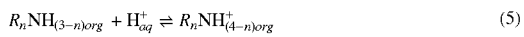

$$R_nNH_{(3-n)org} + H^+_{aq} \rightleftharpoons R_nNH^+_{(4-n)org} \qquad (5)$$

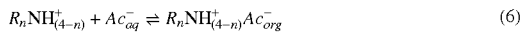

$$R_nNH^+_{(4-n)} + Ac^-_{aq} \rightleftharpoons R_nNH^+_{(4-n)}Ac^-_{org} \qquad (6)$$

However, molecules of water can react with these complexes via H-bond as shown below:

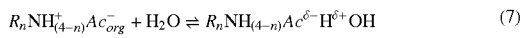

$$R_nNH^+_{(4-n)}Ac^-_{org} + H_2O \rightleftharpoons R_nNH_{(4-n)}Ac^{\delta-}H^{\delta+}OH \qquad (7)$$

When amine reacts with acetic acid molecules, it is possible that water can create a bond with acetic acid molecules to form a weak complex, which is called solvation. Chen et al. have shown that at lower acid concentration levels, moles of water extracted per mole of TOA increase linearly with the acid concentration [see, F. Chen et al., *Extraction of lower carboxylic acids from aqueous solution by tri-n-octylamine*, J. Chem. Eng. of Japan, 22 (1989), 6-11]. The published literature also shows that the amount of water coextraction changes when different diluents have been used with amine (organic) phase. The water coextraction decreases in the order of 1-octanol>MIBK>nitrobenzene>methylenechloride> chloroform>heptane [see, J. A. Tamada et al., *Extraction of carboxylic acid with amine extractants* (1-3), Ind. Eng. Chem. Res., 29 (1990) 1319-1338].

Water can solvate with molecules of acetic acid to create a complex structure via hydrogen bond. Monocarboxylic acids carry less water with them than do dicarboxylic acids, which may reflect the tendency of coextracted water molecules to associate with the carboxylic group. From the reported experiments with changing temperature, all fluxes increase substantially with increasing temperature; however, the flux of water did not change much compared with the fluxes of other constituents, which yielded a higher solvent concentration and selectivity. The extent of coextraction of water is most likely to be affected to a limited extent by the increase in temperature.

Influence of Thinner TOA on Pervaporation Performance

Although the liquid membranes described above have yielded excellent/very high selectivity, the species fluxes are on the low side, primarily due to the thick liquid membrane. The thickness of the liquid membrane is substantially equal to the thickness of the fiber wall, e.g., about 50 μm. According to exemplary embodiments of the present disclosure, thinner liquid membranes have been investigated by reducing the liquid membrane thickness in the hollow fiber wall.

Figure 13A:
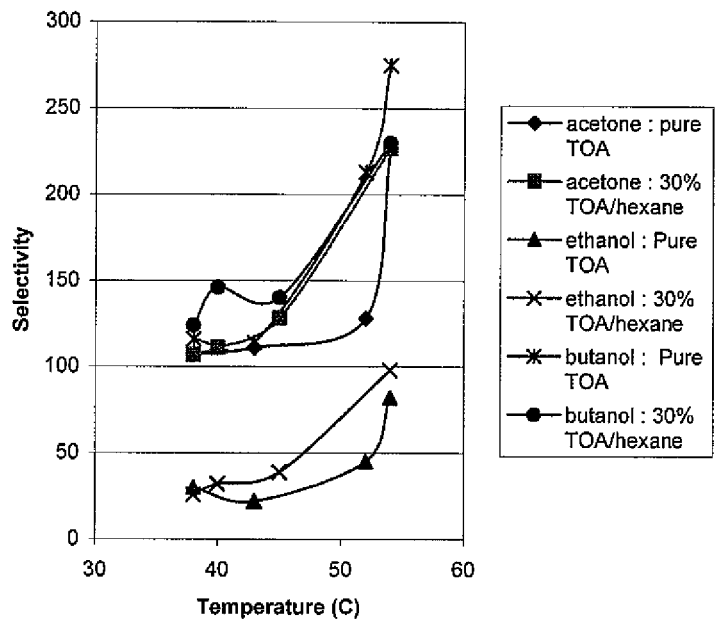
FIGS. 13A and 13B graphically represents pervaporation performance with respect to selectivity and permeate mass flux, respectively, when a thinner tri-n-octylamine (TOA) liquid membrane was used as compared with a "full thickness" TOA liquid membrane. (Module 13, 30 vol % TOA, 70 vol % hexane as liquid membrane; Module 11, pure TOA as liquid membrane, concentrations of acetone, ethanol and butanol were 0.8, 0.5 and 1.5 wt %. respectively.)
Figure 13B:
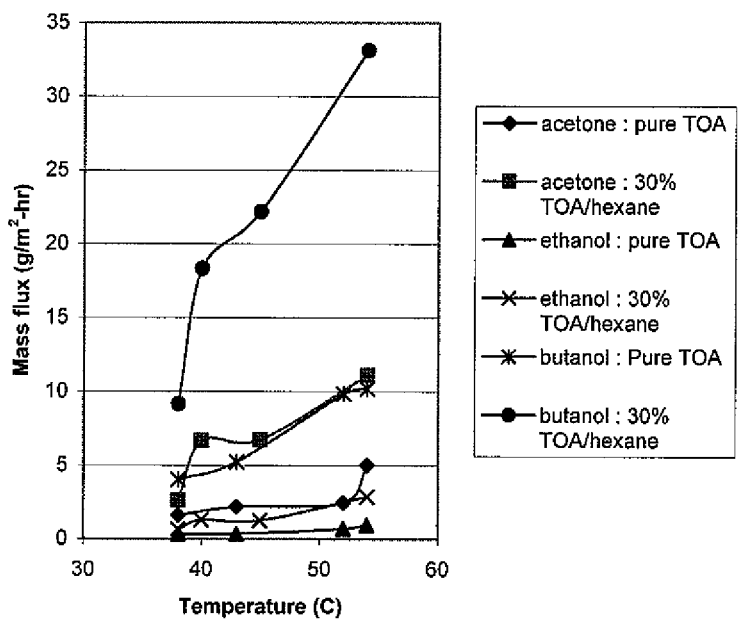

A mixture consisting of 30 vol % TOA as the supported liquid membrane and 70% hexane as the diluent was used to produce a thinner liquid membrane. The module (module #13) having a thinner TOA layer was used for pervaporation with a model feed solution for various feed temperatures from 38° C. to 54° C. The pervaporation results with the thinner TOA as the liquid membrane were compared with the results using a thick TOA liquid membrane, as illustrated in FIG. 13. As demonstrated by the noted test results, the selectivities of the solvents over water did not change with the thickness of the TOA liquid membrane in view of the applicable solution-diffusion mechanism. Their selectivities were increased at the elevated temperature, as in the case of the thick liquid membrane, spanning the whole fiber wall thickness as the liquid membrane; however, the mass fluxes of those solvents were increased by more than 3 times compared to the solvent fluxes using the full fiber wall for the supported liquid membrane. This beneficial result may be attributed to a reduction in the mass transfer resistance in the liquid membrane due to the decreased liquid membrane thickness. Of note, the mass fluxes of the solvents were elevated by the same factor by which the liquid membrane thickness was reduced. Further, this increased flux reflects the extent of increased $N_2$ permeance shown in Table 2.

Figure 14:
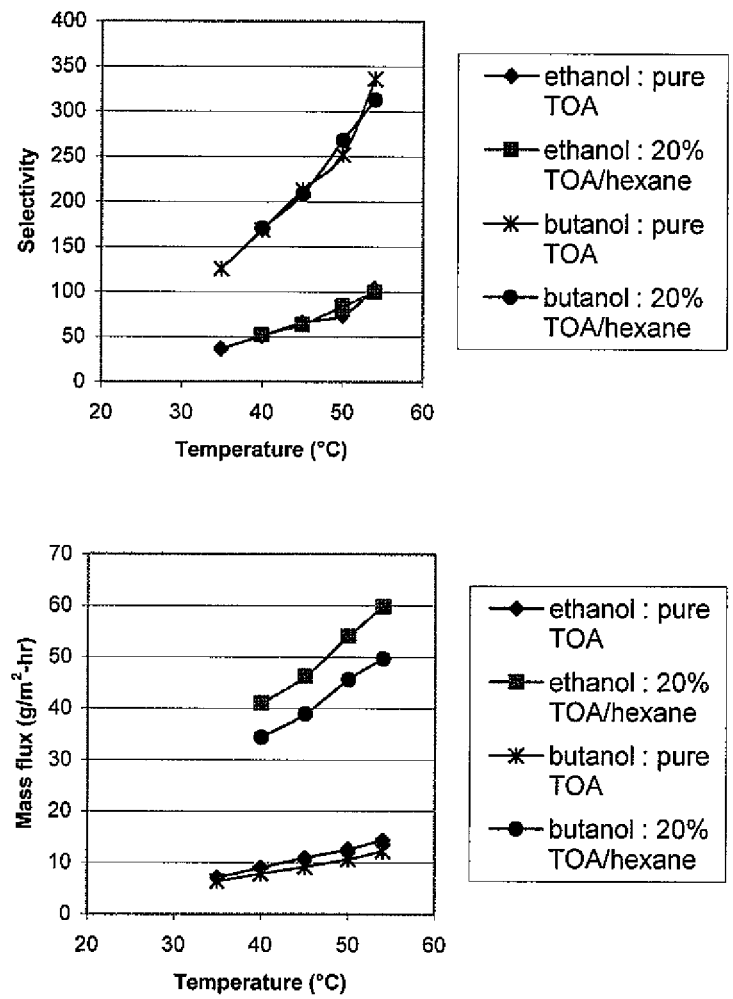
FIG. 14 shows pervaporation performance when a thinner liquid membrane of TOA is compared with a full thickness TOA liquid membrane for selectivity and permeate mass fluxes, respectively. (Module 14, 20 vol % TOA, 80 vol % hexane used to prepare a thin liquid membrane; Module 11, pure TOA as liquid membrane; concentrations of ethanol and butanol were ~10 and 2.0 wt %, respectively).
Figure 14A:
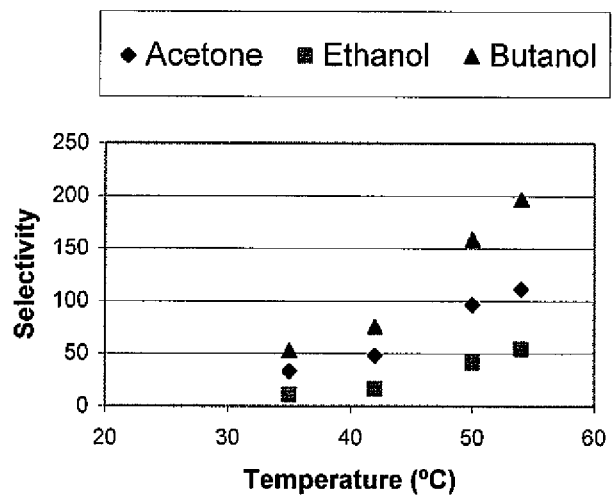
FIGS. 14A and 14B show pervaporation performance with respect to selectivity and permeate mass flux, respectively, for thinner TOA liquid membranes with a fermentation broth as the feed. (Module 13, 30 vol % TOA 70 vol % hexane as liquid membrane; concentrations of acetone, ethanol, butanol were 0.8, 0.7 and 1.5 wt %, respectively, in the fermentation broth.)
Figure 14B:
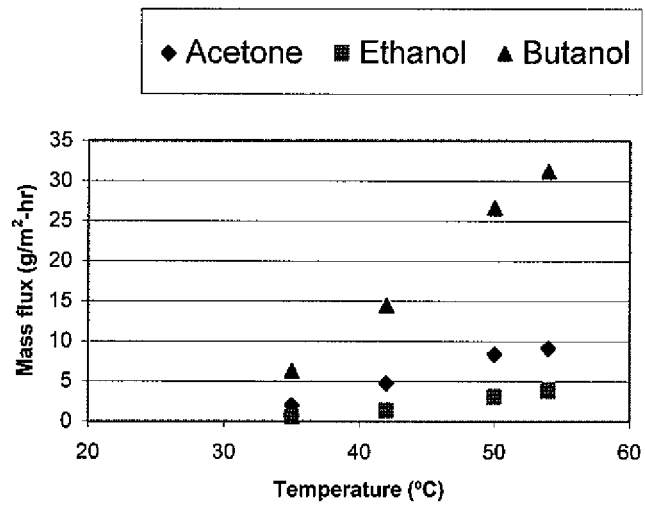

With reference to FIG. 14, a mixture consisting of 20 vol % TOA as the supported liquid membrane and 80% hexane as the diluent was used to make an even thinner liquid membrane. The module (module 14; see Table 4 below) having a thinner TOA layer was used for pervaporation using a model feed solution for various feed temperatures from 40° C. to 54° C. The results for pervaporation with the thinner TOA as the liquid membrane were compared with the result using a thick TOA liquid membrane, as illustrated in FIG. 14. The selectivities of the solvents over water did not change with the thickness of the TOA liquid membrane, since the solution-diffusion mechanism is operative. Their selectivities were increased at the elevated temperature as in the case of the thick liquid membrane spanning the whole fiber wall thickness as the liquid membrane. However, the mass fluxes of those solvents were increased by more than almost 5 times compared to the solvent fluxes using the full fiber wall for the supported liquid membrane. More importantly, the selectivities of the species remain very high while the mass fluxes have been increased by almost 5 times. The flux for ethanol reached a value of 59.8 g/m²-hr which compares favorably vis-à-vis polymeric membranes.

Of note, alternative diluents may be employed provided the diluents provide sufficient/appropriate levels of volatility. Thus, for example, other volatile alkanes, volatile alcohols, volatile aromatics and mixtures thereof, may be employed to yield thin liquid membranes in the manner disclosed herein.

Performance of a Thin Liquid Membrane with a Fermentation Broth as Feed

An experiment was carried out using a filtered fermentation broth as a feed solution and a thin liquid membrane (module 13) as a pervaporation membrane. After the fermentation was accomplished, the fermentation broth was filtered with a 0.5 μm flat sheet filter and kept in a refrigerator to stop further fermentation. The concentrations of acetone, butanol and ethanol in the fermentation broth were 0.8, 1.7 and 0.7 wt %, respectively. The experiments were conducted at various temperatures from 35 to 54° C., as shown in FIG. 14. Of note, the selectivity and mass fluxes were increased with increasing temperature; the values of selectivity achieved were 197, 111 and 54 for butanol, acetone, and ethanol, respectively, at a temperature of 54° C. The butanol, acetone and ethanol mass fluxes were 31, 9, and 4 g/m-hr, respectively, which values were close to those of the model solution. However, the experiment was relatively short in duration due to membrane fouling from cell debris which required cleaning. Such fouling may likely be reduced through filtration with smaller pore size filters.

Thus, an exemplary and highly advantageous embodiment of the disclosed membrane structure included (i) a nanoporous hydrophobic coating on the outside diameter of the porous hydrophobic hollow fiber substrate of polypropylene and (ii) contained an ultrathin liquid membrane of tri-n-octylamine. The noted membrane structure may be used to develop and implement highly effective and advantageous pervaporation techniques. For example, the disclosed membrane may be used with a filtered fermentation broth flowing on the outside diameter and with a vacuum being pulled on the fiber internal diameter to achieve pervaporation removal of volatile solvents (VOCs) (see FIG. 14). The data in FIG. 14 were obtained using a filtered fermentation broth devoid of cells (thereby negating the need to filter the fermentation broth).

In the disclosed exemplary embodiments, the fermentation broth is generally allowed to flow through the fiber bores, as in conventional hollow fiber-based microfiltration processes. However, with an ultrathin liquid membrane as in FIG. 14, the broth would not contact the liquid membrane (which is on the other side of the hydrophobic pore). Indeed, the broth also cannot enter the hydrophobic pore. A gas gap is created in the rest of the pore (into which the volatile solvents from the unfiltered fermentation broth will be evaporated). Meanwhile, a vacuum is pulled on the shell side of the hollow fibers to carry out the pervaporation process. The process may be efficiently implemented using somewhat larger bore hollow fiber diameters.

Contamination of the Feed Solution by TOA

Figure 15:
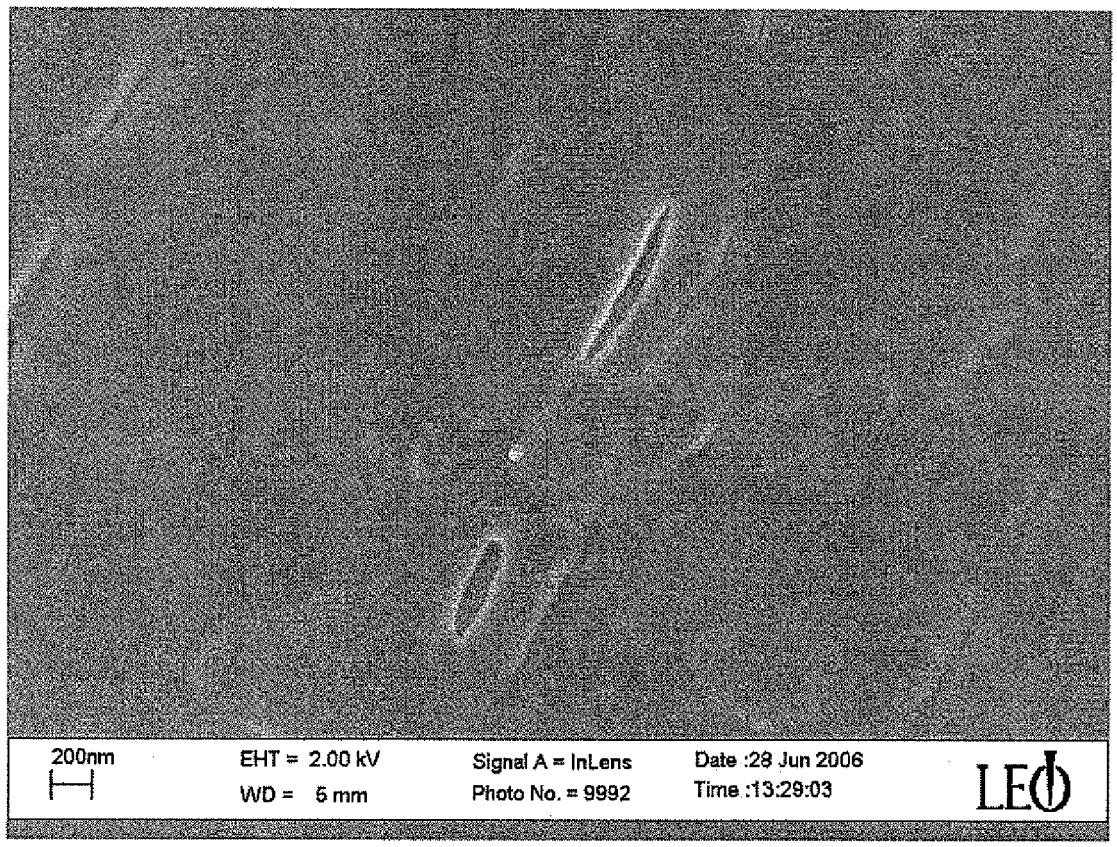
FIG. 15 shows the outside surface of fluorosilicone coated hollow fiber.
Figure 16:
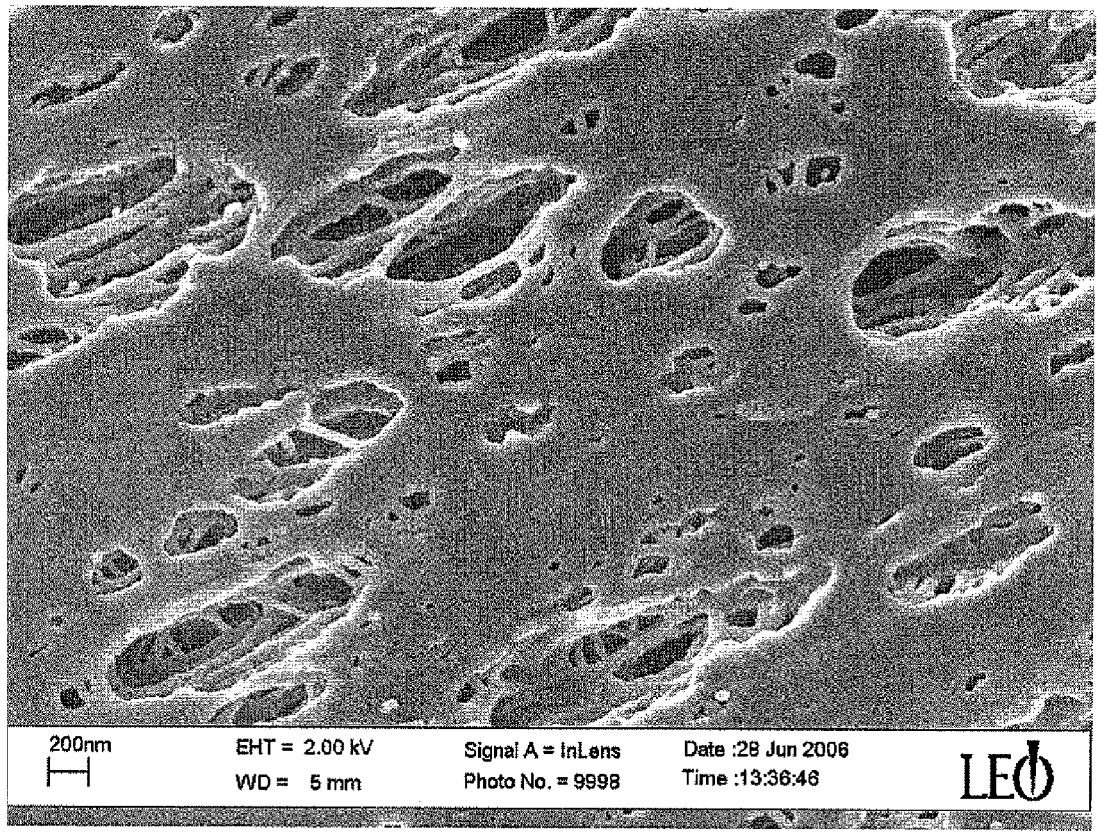
FIG. 16 shows the inside surface of fluorosilicone coated hollow fiber showing the porous structure.
Figure 17:
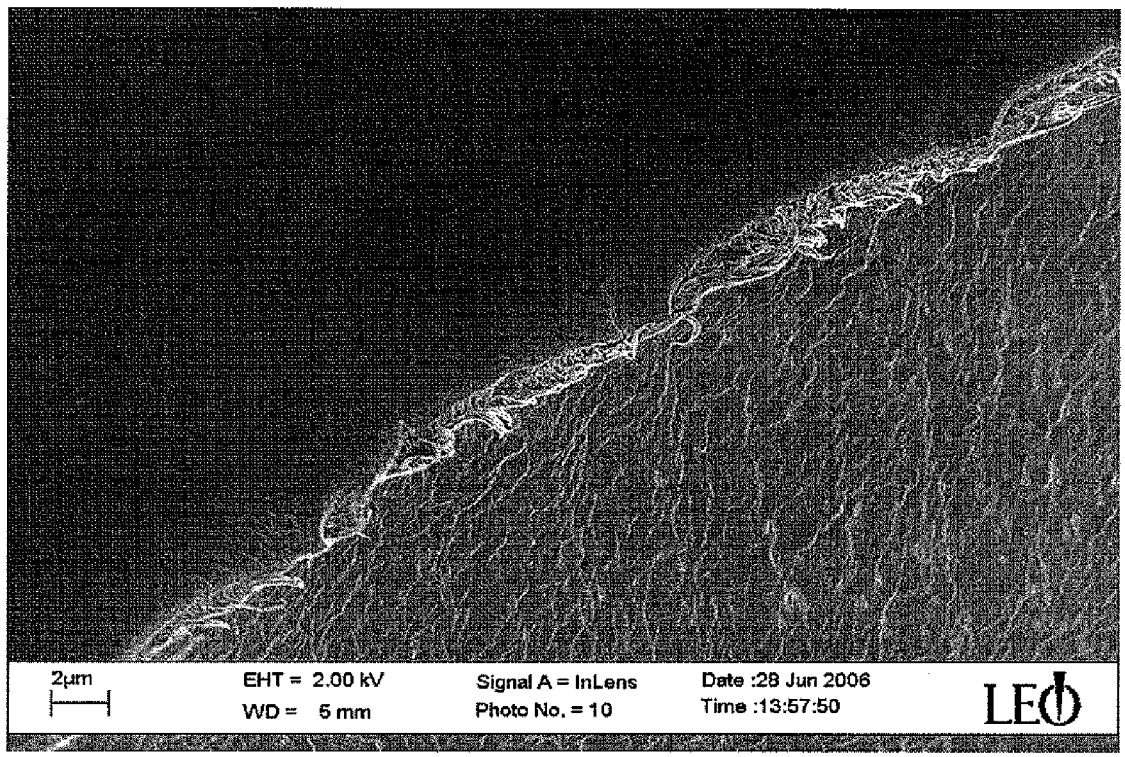
FIG. 17 shows the cross-sectional area of a fluorosilicone coated hollow fiber.

Potential contamination of the feed solution by TOA was investigated experimentally using water as the feed through the module containing the thinner ILM of module 13. The experiment was carried out at 35° C. for 4 hours with the feed being recycled. The amount of TOA in the feed was analyzed with the help of the established calibration. The concentration of TOA in the feed solution was found to be 0.3 ppm, which is quite low. This limited amount of contamination was most likely from coating defects visible in FIG. 15. FIG. 16 illustrates the inside fiber surface which does not have any coating and therefore shows many large pores characteristic of the hollow fiber substrate. FIG. 17 illustrates the fluorosilicone coating layer on the outside surface of the fiber from a cross sectional point of view.

Stability of TOA for Pervaporation Performance

As noted above, the TOA liquid membrane immobilized in module 11 containing the coated fibers was used to remove solvents from aqueous solutions for more than 300 hours. This performance duration is much longer than the reported experiment using oleyl alcohol for removing butanol from aqueous solutions [see, M. Matsumura et al., *Separation of dilute aqueous butanol and acetone solutions by pervaporation through liquid membranes*, Biotechnol. Bioeng. 30 (1987) 1991-1992]. In fact, Matsumura et al. recommended saturating the broth with oleyl alcohol to increase the liquid membrane life. The TOA-based SLM in module 11 has also demonstrated stability in flux and selectivity without adding any liquid membrane or reimmobilization of the type undertaken by Qin et al. [see, Y. Qin et al., *Pervaporation Membrane that are Highly Selective for Acetic Acid Over Water*, Ind. Eng. Chem. Res., 42 (2003) 582-595].

Figure 18:
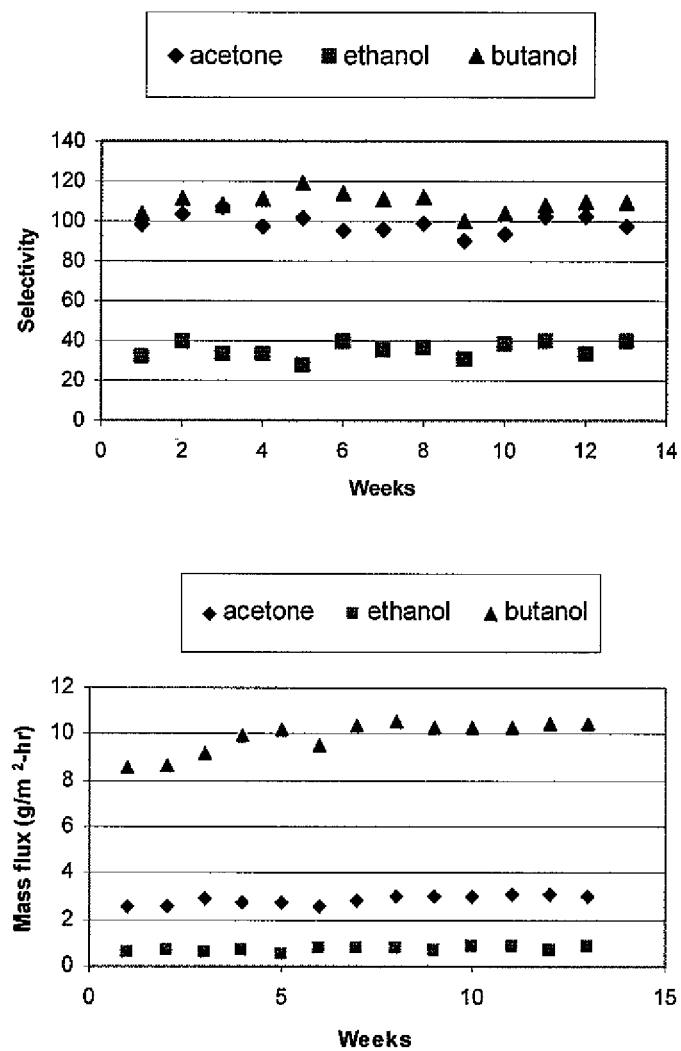
FIG. 18 shows performance of TOA as the liquid membrane with coated hollow fibers as the support with feed mixture for an extended run with respect to selectivity and mass flux, respectively. (Module 16, pure TOA as liquid membrane, feed composition: acetone 0.8 wt %, ethanol 0.5 wt %, butanol 1.5 wt %; temperature of feed: 45° C.)
Figure 18A:
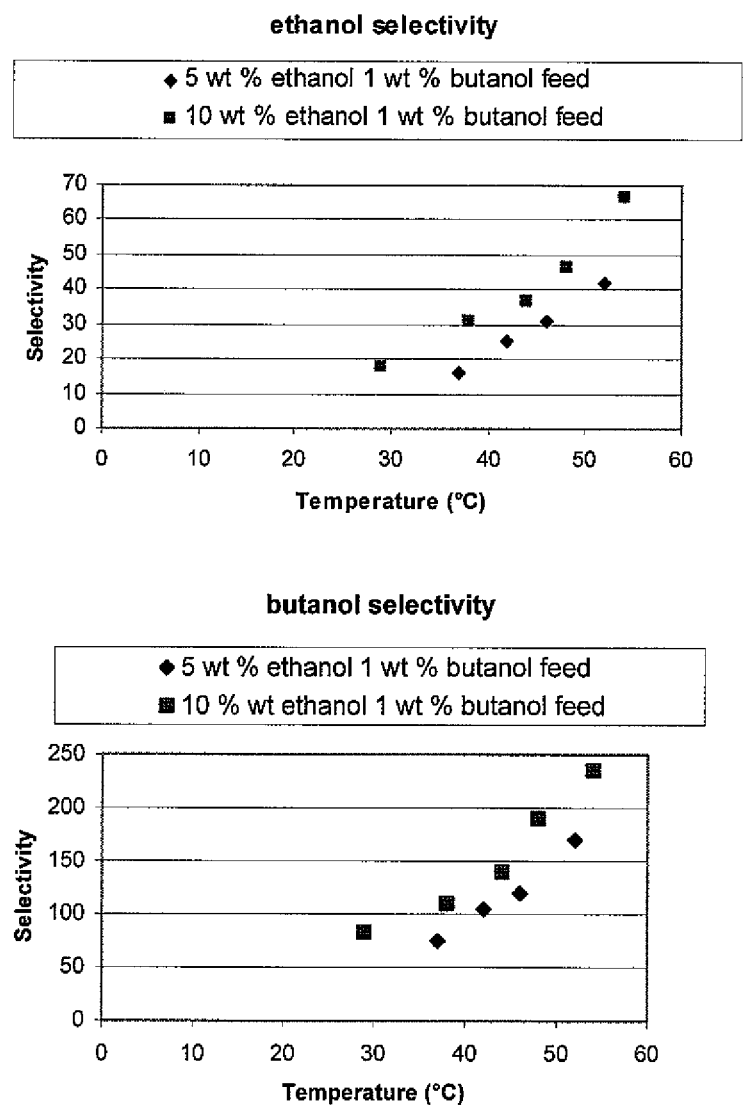
FIGS. 18A and 18B illustrate selectivity and flux performance, respectively, of tri-n-octylamine (TOA) as the liquid membrane with coated hollow fibers as the support with two different ethanol-butanol feed mixtures at different temperatures. (Module 11 pure TOA as liquid membrane).
Figure 18B:
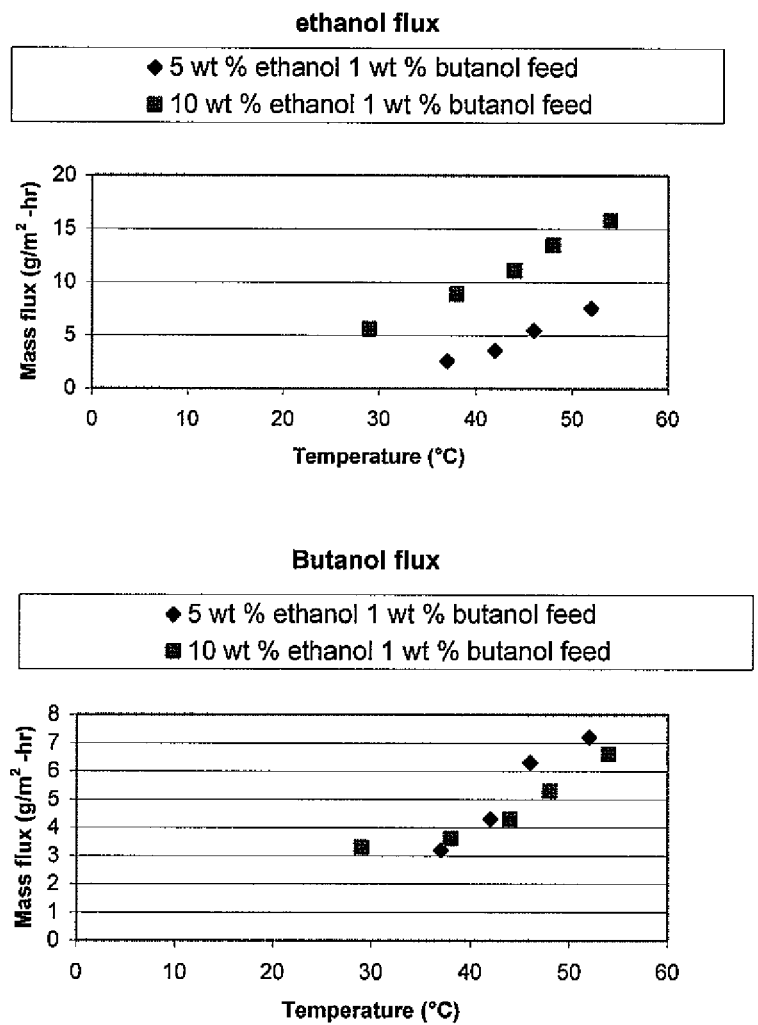

In FIG. 18, the results of an extended run using module 16 are set forth, where the feed included 0.5 wt % ethanol, 0.8 wt % acetone and 1.5 wt % n-butanol at 45° C. The reported results reflect an extended run that lasted for 13 weeks according to the experimental procedures described herein. The results appear to be quite stable despite the extended duration run. Module 16 is described below in Table 4.

TABLE 4

Details of additional hollow fiber membranes and modules

| Module No. | 11 | 14 | 16 |
|---|---|---|---|
| Membrane type | Coated polypropylene* | Coated polypropylene* | Coated polypropylene* |
| Characteristics | Porous having a nanoporous fluorosilicone coating on the O.D. | Porous having a nanoporous fluorosilicone coating on the O.D. | Porous having a nanoporous fluorosilicone coating on the O.D. |
| Number of fibers | 36 | 25 | 30 |
| Porosity | 0.45 | 0.45 | 0.45 |
| I.D.** (µm) | 280 | 280 | 280 |
| O.D.** (µm) | 380 | 380 | 380 |
| Effective length (cm) | 13.0 | 13.5 | 13.5 |
| Mass transfer area (cm$^2$)*** | 42.6 | 29.7 | 35.6 |
| Shell details | ⅜ in O.D. plastic tube | ⅜ in O.D. plastic tube | ⅜ in O.D. plastic tube |

*Provided by Applied Membrane Technology Inc., Minnetonka, MN
**O.D. (outside diameter); I.D. (inside diameter)
***Based on fiber I.D.

These results demonstrate that the disclosed coating advantageously prevented loss of TOA with only a minor decrease in solvent flux. When the hydrophobic porous polypropylene (PP) hollow fibers contact the solvent in the feed, the nonporous portion thereof may be swollen slightly by solvent. This swelling can reduce the porosity of the membrane a bit and increase the mass transfer resistance. The fatty amine (TOA) has long organophilic hydrocarbon tails, which adsorb onto the surface of pores on the membrane walls. The adsorbed amine molecules can also act like fixed carriers leading to somewhat higher selectivity.

Exemplary embodiments of the present disclosure thus provide advantageous coated porous polypropylene fiber membrane that may be utilized in a liquid membrane based pervaporation technique for the removal and recovery of solvents from aqueous solutions. The disclosed membranes are highly selective and exhibit stability over an extended period of time, thus preventing breakdown of the liquid membrane and contamination of the fermentation broth. As described herein, at least three aspects of the disclosed membrane technology offer significant advantages relative to prior art teachings and techniques.

First, application of a nanoporous coating, e.g., a flourosilicone nanoporous coating, to a hollow fiber substrate yields advantageous results. By applying a nanoporous coating to the porous hollow fiber substrate, wetting is prevented from either side of the coating, leaving a "gas gap" between the membrane and the feed solution. More particularly, the liquid membrane does not wet the coating micropores from the substrate side, and neither does the aqueous fermentation broth from the other side. Wetting prevention allows the solvent to evaporate through the pores without any loss of the liquid membrane to the feed solution, thereby leading to the virtual elimination of membrane breakdown and contamination of fermentation broth.

Second, the use of tri-n-octylamine (TOA) as a liquid membrane, in particular a thin layer membrane, further supports advantageous results. The present disclosure also provides a process for reducing the membrane thickness. TOA exhibits high stability, high selectivity and a virtual insolubility in water, making it an attractive choice for a liquid membrane. Previous experimentation used a membrane thickness equivalent to the depth of the pores. Advantages of using a thinner membrane result, at least in part, from a decrease in the mass transfer resistance. The selectivity of the solvents over the water remains constant, but the mass fluxes of the solvents increase proportional with the decrease of the thickness of membrane layer.

Figure 19A:
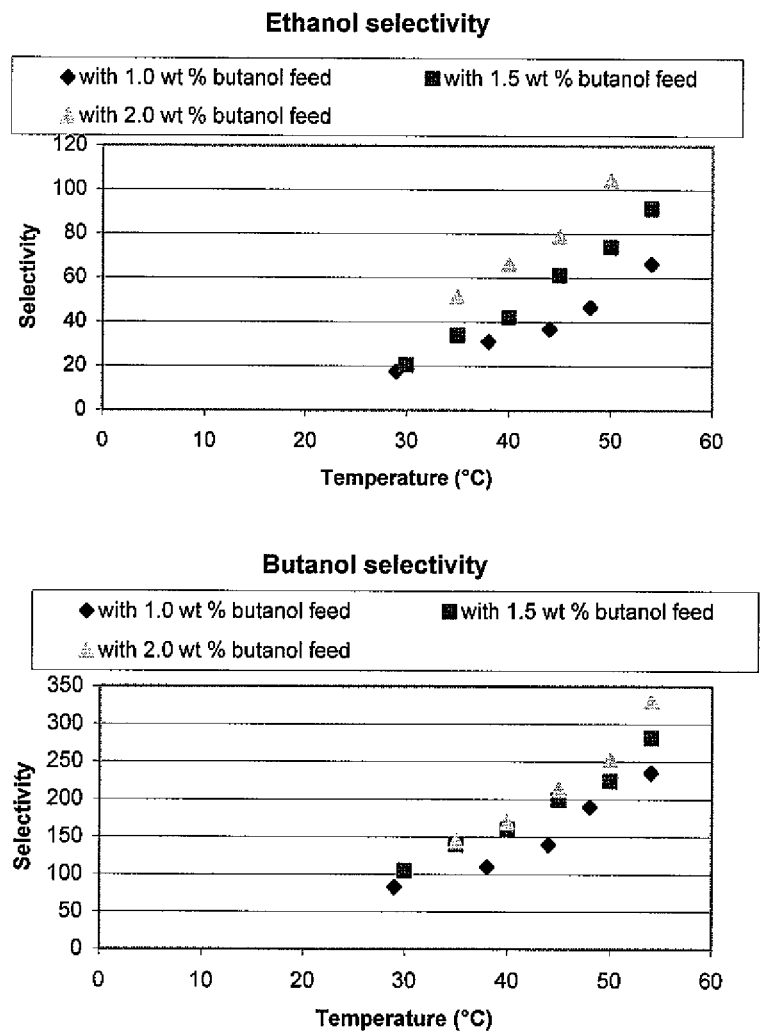
FIGS. 19A and 19B illustrate selectivity and flux performance, respectively, of tri-n-octylamine (TOA) as the liquid membrane with coated hollow fibers as the support with different butanol-containing feed mixtures at different temperatures. (Module 11; pure TOA as liquid membrane; ethanol concentration in the feed 10 wt %.)
Figure 19B:
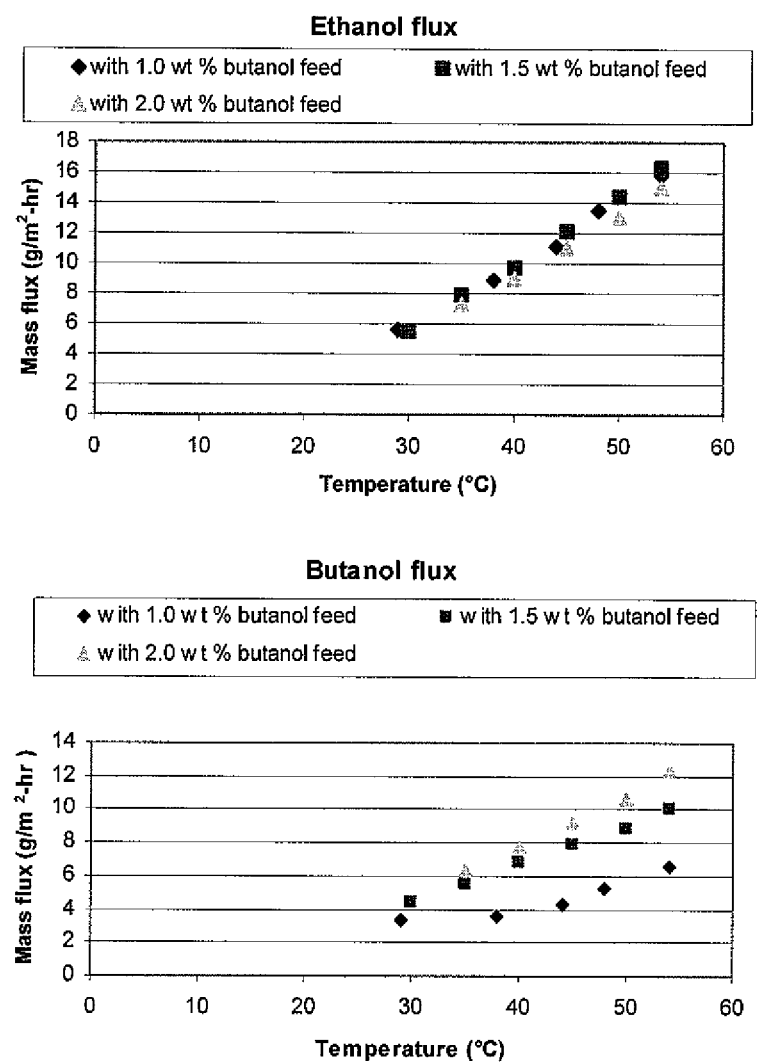
Figure 20A:
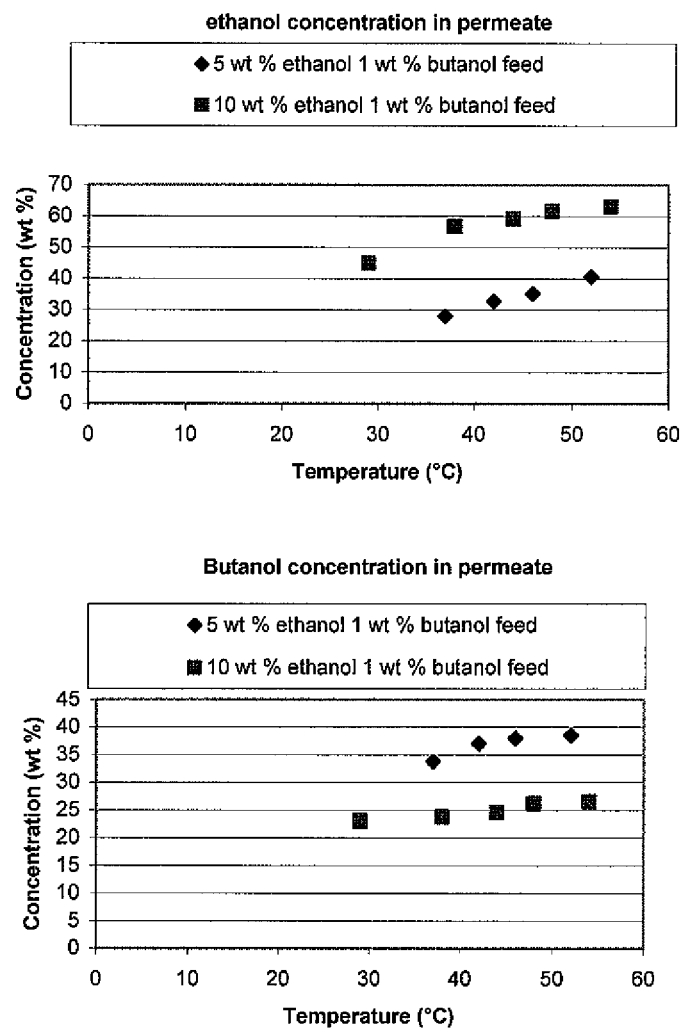
FIGS. 20A and 20B illustrate concentrations of ethanol and butanol in the permeate from pervaporation using tri-n-octylamine (TOA) as the liquid membrane with coated hollow fibers as the support with different feed mixtures at different temperatures. (Module 11; pure TOA as liquid membrane, ethanol concentration 10 wt % in the feed unless noted otherwise.)
Figure 20B:
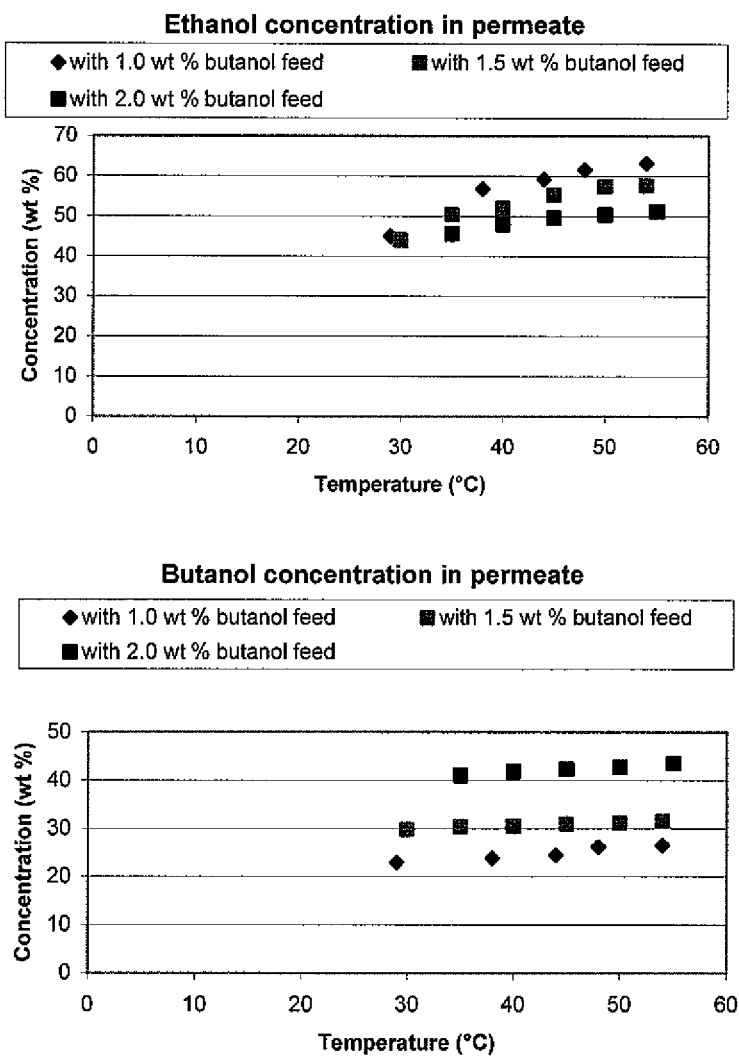

Third, the addition of butanol into the feed solution advantageously functions to increase the selectivity of the membrane. A significant increase in membrane selectivity increases the overall efficiency of the process. Generally, the ethanol concentrations studied were lower, less than 1%. However, in traditional ethanol fermentations from various yeasts, the ethanol concentration can vary between 5 to 14%. Therefore, in the series of experimental results reported herein, the ethanol concentrations were either 5 or 10%. To this feed solution was added either 1 wt % butanol or 1.5 wt % or 2 wt % butanol. As shown in FIG. 18 (corresponding to 1 wt % added butanol in feed solution), ethanol selectivity of the membrane for 10 wt % ethanol in feed has increased to almost 70. Ethanol flux has gone up to 16 g/m$^2$-hr. FIG. 19 illustrates that for 1.5 wt % butanol in feed, ethanol selectivity has gone up to 90+. With 2 wt % butanol in feed, the selectivity has gone up to 100+. The beneficial implication of these results is shown in FIG. 20 for 1 wt % butanol added to the feed solution: Ethanol concentration in the permeate has gone up to 64% and butanol concentration up to 26%. Between them, the permeate is 90% organics. For 1.5 wt % butanol in the feed, ethanol concentration in the permeate has reached about 58% whereas butanol concentration is hitting about 32% for a total of 90% organics. Since the boiling point of ethanol is 78° C. and that of butanol is 118° C., their separation by distillation may be relatively easy and much less energy intensive. Any remaining water will be split between the two fractions leading to a top ethanol fraction with a very high ethanol concentration ready for removal of the last traces of water by pervaporation using water-selective membranes.

Figure 21:
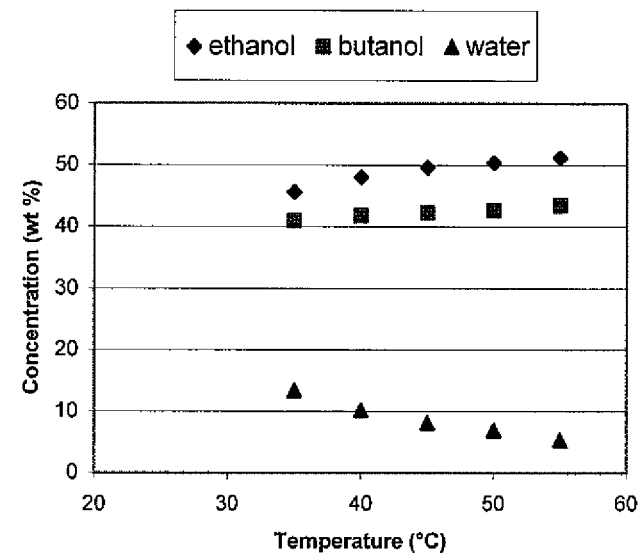
FIG. 21 illustrate concentrations of solvents (ethanol and n-butanol) and water in the permeate side when n-butanol at the level of 2.0 wt % and 2.5 wt %, respectively, was added to an ethanol solution. (Module 11, pure TOA as liquid membrane, ethanol ~10 wt % in feed).
Figure 21:
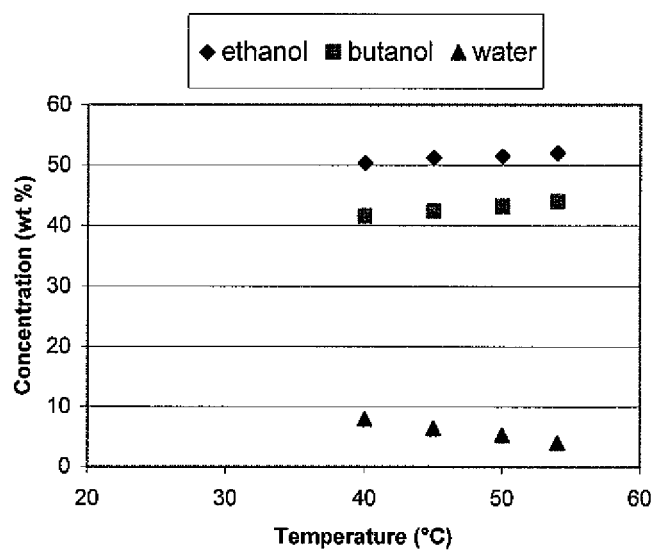

With reference to FIG. 21, the concentrations of ethanol and n-butanol in the permeate were quite high; 52 wt % ethanol, 44 wt % n-butanol and 4 wt % water, from ~10 wt % ethanol and 2.5 wt % n-butanol in the feed at 54° C. The total solvent concentration in the permeate side was 96 wt % when 2.5 wt % of n-butanol was added into the feed as illustrated in FIG. 21. For 2.0 wt % n-butanol added, the total solvent concentration in the permeate side is around 95 wt % showing that a higher level of n-butanol addition leads to an ever higher organics concentration in the permeate; perhaps an n-butanol concentration higher than 2.5% in the feed can essentially reduce water content in the permeate to a very low level.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

What is claimed is:

1. A liquid membrane system, comprising:
 a. a porous hydrophobic hollow fiber substrate, the porous hydrophobic hollow fiber substrate having an outer wall and an inner wall, the distance between the outer wall and the inner wall defining a fiber thickness, with the inner wall defining a hollow lumen;
 b. a nanoporous hydrophobic coating applied to the outer wall of the porous hydrophobic hollow fiber substrate and defining a coating on the outer wall, the coating having nanopores; and
 c. an ultrathin liquid membrane positioned within a partial portion of the pores of the fiber substrate between the outer and inner walls of the porous hydrophobic hollow fiber substrate, the ultrathin liquid membrane extending from the outer wall to a position along the pores toward the inner wall to define a membrane thickness;
 wherein the nanopores of the hydrophobic coating do not include the ultrathin liquid membrane within the nanopores of the hydrophobic coating;
 wherein the nanoporous hydrophobic coating is effective to prevent wetting of the coating nanopores by the ultrathin liquid membrane and to thereby substantially facilitate solvent evaporation through the nanoporous hydrophobic coating;
 wherein the membrane thickness of the ultrathin liquid membrane is less than one-third the fiber thickness of the porous hydrophobic hollow fiber substrate;
 wherein the nanoporous hydrophobic coating is a fluorosilicone material;
 wherein the nanoporous hydrophobic coating is more hydrophobic than the porous hydrophobic hollow fiber substrate;
 wherein when an aqueous system that contains one or more solvents contacts the hydrophobic coating, the hydrophobic coating prevents the aqueous system from wetting the nanopores of the hydrophobic coating and prevents the liquid membrane from wetting the nanopores of the hydrophobic coating, thereby forming a first gas gap, via the un-wetted nanopores of the hydrophobic coating, between the liquid membrane and the aqueous system, the first gas gap configured to allow the one or more solvents to evaporate through the nanopores of the coating without loss of liquid membrane to the aqueous system; and wherein when the aqueous system contacts the inner wall of the fiber substrate via the lumen, the hydrophobic pores of the fiber substrate prevent the aqueous system from wetting the liquid membrane, thereby forming, a second gas gap, via the pores of the fiber substrate that: (i) do not contain the liquid membrane and (ii) are un-wetted by the aqueous system, between the liquid membrane and the aqueous system, the second gas gap configured to allow the one or more solvents to evaporate through the pores of the fiber substrate without loss of liquid membrane to the aqueous system.

2. The liquid membrane system of claim 1, wherein the ultrathin liquid membrane includes a material selected from the group consisting of tri-n-octylamine (TOA), tri-laurylamine, and tri-decylamine.

3. The liquid membrane system of claim 1, wherein the porous hydrophobic hollow fiber substrate is fabricated from a material selected from the group consisting of polypropylene, polyethylene, poly-4-methylpentene, polysulfone and polyvinylidenefluoride (PVDF).

4. A liquid membrane system, comprising:
a. a porous hydrophobic hollow fiber substrate, the porous hydrophobic hollow fiber substrate having an outer wall and an inner wall, the distance between the outer wall and the inner wall defining a fiber thickness, with the inner wall defining a hollow lumen;
b. a nanoporous hydrophobic coating applied to the outer wall of the porous hydrophobic hollow fiber substrate and defining a coating on the outer wall, the coating having nanopores; and
c. an ultrathin liquid membrane positioned within a partial portion of the pores of the fiber substrate between the outer and inner walls of the porous hydrophobic hollow fiber substrate, the ultrathin liquid membrane extending from the outer wall to a position along the pores toward the inner wall to define a membrane thickness;
wherein the nanopores of the hydrophobic coating do not include the ultrathin liquid membrane within the nanopores of the hydrophobic coating;
wherein the nanoporous hydrophobic coating is effective to prevent wetting of the coating nanopores by the ultrathin liquid membrane and to thereby substantially facilitate solvent evaporation through the nanoporous hydrophobic coating;
wherein the membrane thickness of the ultrathin liquid membrane is less than one-third the fiber thickness of the porous hydrophobic hollow fiber substrate;
wherein the ultrathin liquid membrane with the membrane thickness is fabricated by mixing the liquid membrane with a volatile diluent, immobilizing the mixture in the porous hydrophobic hollow fiber substrate, passing a gas by the porous hydrophobic hollow fiber substrate to cause evaporation of the volatile diluent, yielding an ultrathin liquid membrane with the membrane thickness;
wherein the nanoporous hydrophobic coating is a fluorosilicone material;
wherein the nanoporous hydrophobic coating is more hydrophobic than the porous hydrophobic hollow fiber substrate;
wherein when an aqueous system that contains one or more solvents contacts the hydrophobic coating, the hydrophobic coating prevents the aqueous system from wetting the nanopores of the hydrophobic coating and prevents the liquid membrane from wetting the nanopores of the hydrophobic coating, thereby forming a first gas gap, via the un-wetted nanopores of the hydrophobic coating, between the liquid membrane and the aqueous system, the first gas gap configured to allow the one or more solvents to evaporate through the nanopores of the coating without loss of liquid membrane to the aqueous system; and
wherein when the aqueous system contacts the inner wall of the fiber substrate via the lumen, the hydrophobic pores of the fiber substrate prevent the aqueous system from wetting the liquid membrane, thereby forming a second gas gap, via the pores of the fiber substrate that: (i) do not contain the liquid membrane and (ii) are un-wetted by the aqueous system, between the liquid membrane and the aqueous system, the second gas gap configured to allow the one or more solvents to evaporate through the pores of the fiber substrate without loss of liquid membrane to the aqueous system.

5. The liquid membrane system of claim 4, wherein the volatile diluent is selected from the group consisting of a volatile alkane, a volatile alkene, a volatile alcohol, a volatile aromatic and mixtures thereof.

6. The liquid membrane system of claim 4, wherein the ultrathin liquid membrane includes a material selected from the group consisting of tri-n-octylamine (TOA), tri-laurylamine, and tri-decylamine.

7. The liquid membrane system of claim 4, wherein the porous hydrophobic hollow fiber substrate is fabricated from a material selected from the group consisting of polypropylene, polyethylene, poly-4-methylpentene, polysulfone and polyvinylidenefluoride (PVDF).

8. The liquid membrane system of claim 4, wherein the critical surface tension of the nanoporous hydrophobic coating is less than about 20 dyne/cm.

9. The liquid membrane system of claim 5, wherein the critical surface tension of the nanoporous hydrophobic coating is less than about 20 dyne/cm.

10. A liquid membrane system, comprising:
a. a porous hydrophobic hollow fiber substrate, the porous hydrophobic hollow fiber substrate having an outer wall and an inner wall, the distance between the outer wall and the inner wall defining a fiber thickness, with the inner wall defining a hollow lumen;
b. a nanoporous hydrophobic coating applied to the outer wall of the porous hydrophobic hollow fiber substrate and defining a coating on the outer wall, the coating having nanopores; and
c. an ultrathin liquid membrane positioned within a partial portion of the pores of the fiber substrate between the outer and inner walls of the porous hydrophobic hollow fiber substrate, the ultrathin liquid membrane extending from the outer wall to a position along the pores toward the inner wall to define a membrane thickness;
wherein the nanopores of the hydrophobic coating do not include the ultrathin liquid membrane within the nanopores of the hydrophobic coating;
wherein the nanoporous hydrophobic coating is effective to prevent wetting of the coating nanopores by the ultrathin liquid membrane and to thereby substantially facilitate solvent evaporation through the nanoporous hydrophobic coating;
wherein the membrane thickness of the ultrathin liquid membrane is less than one-third the fiber thickness of the porous hydrophobic hollow fiber substrate;
wherein the critical surface tension of the nanoporous hydrophobic coating is less than about 20 dyne/cm;
wherein the nanoporous hydrophobic coating is a fluorosilicone material;

wherein the nanoporous hydrophobic coating is more hydrophobic than the porous hydrophobic hollow fiber substrate;

wherein when an aqueous system that contains one or more solvents contacts the hydrophobic coating, the hydrophobic coating prevents the aqueous system from wetting the nanopores of the hydrophobic coating and prevents the liquid membrane from wetting the nanopores of the hydrophobic coating, thereby forming a first gas gap, via the un-wetted nanopores of the hydrophobic coating, between the liquid membrane and the aqueous system, the first gas gap configured to allow the one or more solvents to evaporate through the nanopores of the coating without loss of liquid membrane to the aqueous system; and wherein when the aqueous system contacts the inner wall of the fiber substrate via the lumen, the hydrophobic pores of the fiber substrate prevent the aqueous system from wetting the liquid membrane, thereby forming a second gas gap, via the pores of the fiber substrate that: (i) do not contain the liquid membrane and (ii) are un-wetted by the aqueous system, between the liquid membrane and the aqueous system, the second gas gap configured to allow the one or more solvents to evaporate through the pores of the fiber substrate without loss of liquid membrane to the aqueous system.

11. The liquid membrane system of claim 10, wherein the ultrathin liquid membrane includes a material selected from the group consisting of tri-n-octylamine (TOA), tri-laurylamine, and tri-decylamine.

12. The liquid membrane system of claim 10, wherein the porous hydrophobic hollow fiber substrate is fabricated from a material selected from the group consisting of polypropylene, polyethylene, poly-4-methylpentene, polysulfone and PVDF.

* * * * *